US012724192B2

(12) United States Patent
Morita et al.

(10) Patent No.: US 12,724,192 B2
(45) Date of Patent: Sep. 1, 2026

(54) DETERMINATION DEVICE AND DETERMINATION METHOD

(71) Applicant: SONY GROUP CORPORATION, Tokyo (JP)

(72) Inventors: Hiroshi Morita, Tokyo (JP); Kazuaki Toba, Tokyo (JP); Masanari Yamamoto, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 0 days.

(21) Appl. No.: 18/837,322

(22) PCT Filed: Feb. 10, 2023

(86) PCT No.: PCT/JP2023/004510
§ 371 (c)(1),
(2) Date: Aug. 9, 2024

(87) PCT Pub. No.: WO2023/157761
PCT Pub. Date: Aug. 24, 2023

(65) Prior Publication Data

US 2025/0147220 A1 May 8, 2025

(30) Foreign Application Priority Data

Feb. 17, 2022 (JP) ................................ 2022-022764

(51) Int. Cl.
*G02B 6/00* (2006.01)
*F21V 8/00* (2006.01)
*G02B 27/30* (2006.01)

(52) U.S. Cl.
CPC .......... *G02B 6/0061* (2013.01); *G02B 27/30* (2013.01)

(58) Field of Classification Search
CPC .............................. G02B 6/0061; G02B 27/30
See application file for complete search history.

(56) References Cited

U.S. PATENT DOCUMENTS 5,200,795 A 4/1993 Kim et al.
2018/0095219 A1* 4/2018 Bookbinder ....... G02B 6/02004
(Continued)

FOREIGN PATENT DOCUMENTS

CN 110926758 A 3/2020
CN 111650688 A 9/2020
(Continued)

OTHER PUBLICATIONS

International Search Report and Written Opinion of PCT Application No. PCT/JP2023/004510, issued on Apr. 18, 2023, 09 pages of ISRWO.

*Primary Examiner* — Gerald J Sufleta, II
(74) *Attorney, Agent, or Firm* — CHIP LAW GROUP

(57) ABSTRACT

Appropriate determination of a mode ratio in collimated light in a double mode is realizable. A light intensity distribution acquisition unit acquires a light intensity distribution of collimated light containing a basic mode component and a primary mode component. A determination processing unit determines a mode ratio in reference to a slope of a curve that is included in the light intensity distribution on a side where a peak value of light intensity is present with respect to a center positioned at an optical axis of the collimated light and that is located at a portion corresponding to an increase in distances from a distance of the peak value. Appropriate determination of a mode ratio in collimated light in a double mode is achievable, and out-of-specification products are eliminable without use of an expensive part. Accordingly, sufficient communication quality of an optical communication system is guaranteed.

13 Claims, 36 Drawing Sheets

(56) References Cited

U.S. PATENT DOCUMENTS

| | | | | |
|---|---|---|---|---|
| 2019/0339061 | A1* | 11/2019 | Morita | G01B 11/26 |
| 2020/0217750 | A1 | 7/2020 | Floris | |
| 2020/0225407 | A1* | 7/2020 | Urushibara | G02B 6/02019 |
| 2021/0381925 | A1* | 12/2021 | Takahashi | G01M 11/3145 |
| 2022/0082769 | A1* | 3/2022 | Morita | H04B 10/25 |
| 2022/0390674 | A1 | 12/2022 | Morita | |

FOREIGN PATENT DOCUMENTS

| | | | |
|---|---|---|---|
| WO | 2018/131700 | A1 | 7/2018 |
| WO | 2020/153236 | A1 | 7/2020 |
| WO | 2021/095702 | A1 | 5/2021 |

* cited by examiner

FIG. 1

RECEPTION SIDE

TRANSMISSION SIDE

10a

10b

10R

10T

11R

11T

CLAD $n_2$

CORE $n_1$

PROPAGATED LIGHT WAVELENGTH : 1310nm
CORE DIAMETER : 8um
NA : 0.1

CLAD
CORE
BASIC MODE 15R
15T
16R
16T
10R
10T
11R
11T
CLAD
CORE
OPTICAL AXIS OF INCIDENT LIGHT 16R
10R
15R
OPTICAL AXIS OF INCIDENT LIGHT
17R
17T
11R
11T
15T
16T
CLAD
CORE
10T

CLAD
PROPAGATED LIGHT WAVELENGTH : 850nm
CORE DIAMETER : 8um
NA : 0.1
CLAD
CORE
BASIC MODE
+
PRIMARY MODE $b = ((\beta/k)^2 - n_2^2)/(n_1^2 - n_2^2)$
1.0
0.9
0.8
0.7
0.6
0.5
0.4
0.3
0.2
0.1
1
2
3
4
5
6
7
8
9
10
$V = 2.96$
$V = \pi d NA/\lambda$
$LP_{01}$
$LP_{11}$
$LP_{21}$
$LP_{02}$
$LP_{31}$
$LP_{12}$
$LP_{41}$
$LP_{22}$
$LP_{03}$
$LP_{51}$
$LP_{32}$
$LP_{61}$
$LP_{13}$
$LP_{42}$ CORE DIAMETER: 8um
NA : 0.1

INPUT LIGHT
CLAD
CORE
BASIC MODE

INPUT LIGHT
CLAD
CORE
BASIC MODE
PRIMARY MODE
+

BASIC MODE
CLAD
CORE
LIGHT INTENSITY

BASIC MODE
+
PRIMARY MODE
CLAD
CORE
LIGHT INTENSITY

BASIC MODE
+
PRIMARY MODE

P1
P2
P3
CLAD
CORE

P1
CORE

P2
CORE

P3
CORE

X SIDE
Y SIDE
q1 q2 q3 q4 q5 q6

BASIC MODE: PRIMARY MODE
50 : 50

NORMALIZED LIGHT INTENSITY
DISTANCE [um]
X
Y
q1
q2
q3
q4
q5
q6
1
0.9
0.8
0.7
0.6
0.5
0.4
0.3
0.2
0.1
0
-10
-5
0
5
10

20 : 80
NORMALIZED LIGHT INTENSITY
DISTANCE [um]

40 : 60
NORMALIZED LIGHT INTENSITY
DISTANCE [um]

60 : 40
NORMALIZED LIGHT INTENSITY
DISTANCE [um]

80 : 20
NORMALIZED LIGHT INTENSITY
DISTANCE [um]

NORMALIZED LIGHT INTENSITY
1
0.9
0.8
0.7
0.6
0.5
0.4
0.3
0.2
0.1
0
PRIMARY 0%
PRIMARY 100%
4.4
1/e2
0
1
2
3
4
5
6
DISTANCE [um]

DISTANCE [um]
2.6
2.5
2.4
2.3
2.2
2.1
2
1.9
1.8
1.7
1.6
2.04
0
20
40
60
80
100
PERCENTAGE OF BASIC MODE [%]

NORMALIZED LIGHT INTENSITY
1
0.9
0.8
0.7
0.6
0.5
0.4
0.3
0.2
0.1
0
-10
-5
0
5
10
DISTANCE [um]

NORMALIZED LIGHT INTENSITY
1
0.9
0.8
0.7
0.6
0.5
0.4
0.3
0.2
0.1
0
0
1
2
3
4
5
6
DISTANCE [um]

100
TRANSMITTER
LIGHT EMISSION UNIT
201
200
203
CONNECTOR
202
CONNECTOR
402
400
401
CONNECTOR
403
CONNECTOR
301
303
LIGHT RECEPTION UNIT
302
300
RECEIVER 401
402
412
416
411
415
213
202
212
214
215
203
211

202
203
212
216
211
402
412
413
414
415
411
401

LIGHT INTENSITY DISTRIBUTION INFORMATION
501
513
511
512
213
214
202
212
211
217
216
201b
201a
201

Figure 35:
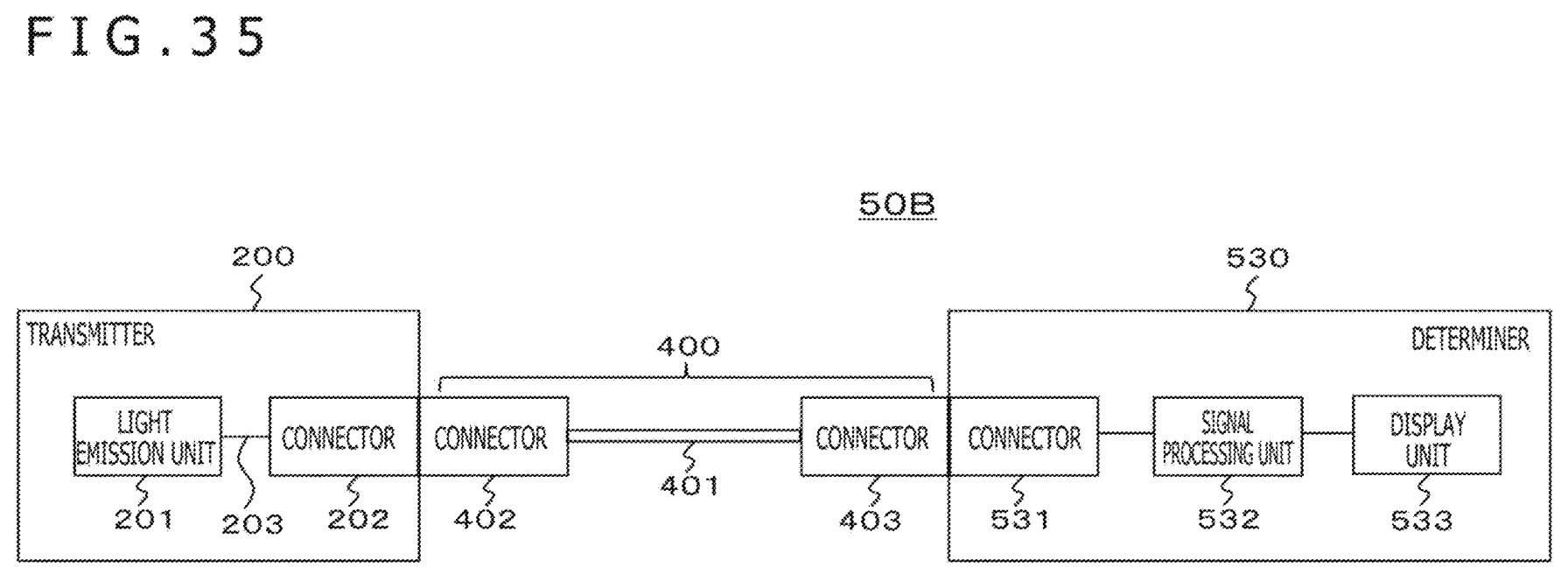

TRANSMITTER
200
LIGHT EMISSION UNIT 201
203
CONNECTOR 202

400
CONNECTOR 402
401
CONNECTOR 403

DETERMINER
530
CONNECTOR 531
SIGNAL PROCESSING UNIT 532
DISPLAY UNIT 533

600
601
CPU
602
ROM
603
RAM
604
605
INPUT/OUTPUT INTERFACE
INPUT UNIT
606
OUTPUT UNIT
607
STORAGE UNIT
608
DRIVE
609
CONNECTION PORT
610
COMMUNICATION UNIT
611
REMOVABLE RECORDING MEDIUM
701
EXTERNALLY CONNECTED DEVICE
702
703

DETERMINATION DEVICE AND DETERMINATION METHOD

CROSS REFERENCE TO RELATED APPLICATIONS

This application is a U.S. National Phase of International Patent Application No. PCT/JP2023/004510 filed on Feb. 10, 2023, which claims priority benefit of Japanese Patent Application No. JP 2022-022764 filed in the Japan Patent Office on Feb. 17, 2022. Each of the above-referenced applications is hereby incorporated herein by reference in its entirety.

TECHNICAL FIELD

The present technology relates to a determination device, a determination method, and a program, and particularly to a determination device and the like for determining a mode ratio in collimated light in a double mode.

BACKGROUND ART

Optical communication using spatial join is conventionally known. In this communication, for example, light emitted from a transmission-side optical fiber is formed into collimated light by a lens, and released therefrom. This collimated light is collected by a reception-side lens and introduced into an optical fiber. In the case of this type of optical communication, a great loss of optical power is produced by misalignment particularly in a single-mode fiber. There has hence been a conventional demand for highly accurate parts sufficient for reducing misalignment. This demand raises costs.

The present applicant has previously proposed an optical communication device capable of reducing costs by lowering accuracy requirement associated with misalignment, i.e., what is generally called a double-mode optical communication device (see PTL 1). This optical communication device has an optical waveguide which propagates only a basic mode for a first wavelength, and communicates using light having a second wavelength and containing a basic mode component and also at least a primary mode component. The second wavelength is a wavelength at which the optical waveguide can propagate at least the primary mode along with the basic mode.

CITATION LIST

Patent Literature

[PTL 1]
PCT Patent Publication No. WO2020/153236

SUMMARY

Technical Problem

When the ratio of the basic mode in the collimated light decreases, a great loss of optical power may be produced by misalignment even in the double mode. It is important for the double-mode optical communication device to determine a mode ratio in collimated light and eliminate out-of-specification products to guarantee sufficient communication quality.

An object of the present technology is to enable appropriate determination of a mode ratio in collimated light in a double mode.

Solution to Problem

A concept of the present technology is directed to a determination device including a light intensity distribution acquisition unit that acquires a light intensity distribution of collimated light containing a first mode component and a second mode component, and a determination processing unit that determines a mode ratio in reference to a slope of a curve that is included in the light intensity distribution on a side where a peak value of light intensity is present with respect to a center positioned at an optical axis of the collimated light and that is located at a portion corresponding to an increase in distances from a distance of the peak value.

According to the present technology, the light intensity distribution acquisition unit acquires the light intensity distribution of the collimated light containing the first mode component and the second mode component. For example, the first mode may be a basic mode, and the second mode may be a primary mode. The determination processing unit determines the mode ratio in reference to the slope of the curve that is included in the light intensity distribution on the side where the peak value of light intensity is present with respect to the center positioned at the optical axis of the collimated light and that is located at the portion corresponding to an increase in distances from the distance of the peak value.

For example, the determination processing unit may normalize the light intensity distribution such that the peak value of light intensity in the light intensity distribution becomes a predetermined value, and shift the light intensity distribution such that a distance of the peak value of light intensity in the light intensity distribution becomes a predetermined value, to obtain a determination light intensity distribution, and then determine the mode ratio in reference to a distance at which light intensity in a curve that is included in the determination light intensity distribution and that corresponds to the curve becomes a predetermined value. In such a manner, appropriate determination of the mode ratio based on the slope of the curve is achievable.

In addition, for example, the determination processing unit may normalize the light intensity distribution such that the peak value of light intensity in the light intensity distribution becomes a predetermined value and shift the light intensity distribution such that a distance of the peak value of light intensity in the light intensity distribution becomes a predetermined value, to obtain a first determination light intensity distribution, then may normalize the first determination light intensity distribution such that a distance corresponding to light intensity of a predetermined value in the first determination light intensity distribution becomes a predetermined distance, to obtain a second determination light intensity distribution, and then determine the mode ratio in reference to a distance at which light intensity in a curve that is included in the second determination light intensity distribution and that corresponds to the curve becomes a predetermined value. In such a manner, appropriate and more accurate determination of the mode ratio based on the slope of the curve is achievable.

In addition, for example, the determination processing unit may determine whether a ratio of the first mode contained in the collimated light is a threshold or higher. In such a manner, whether the ratio of the first mode contained in the collimated light is the threshold or higher can be determined.

In addition, for example, the determination processing unit may determine a ratio of the first mode contained in the collimated light. In such a manner, the ratio of the first mode contained in the collimated light can be determined.

In addition, for example, the light intensity distribution acquisition unit may acquire the light intensity distribution in reference to an imaging signal obtained by capturing an image of the collimated light. In such a manner, the light intensity distribution can appropriately and easily be acquired in reference to the imaging signal.

In this case, for example, an imaging element for obtaining the imaging signal may be further provided. For example, the imaging element here may be disposed on an optical connector. In such a manner, the image of the collimated light can appropriately be captured by the imaging element.

In addition, for example, the collimated light may be obtained, with use of a collimating lens, by collimating light that has a second wavelength and that is output from an output end face of an optical waveguide that propagates only a first mode at a first wavelength. The second wavelength may be a wavelength at which the optical waveguide is configured to propagate at least the second mode as well as the first mode. In this case, the collimated light contains the first mode component and the second mode component at a predetermined ratio. The mode ratio in this collimated light can appropriately be determined.

In this case, the collimating lens may constitute a receptacle of an electronic device, and the determination device may further include a reception unit that receives the collimated light collimated by the collimating lens. In such a manner, the mode ratio in the collimated light emitted from the receptacle of the electronic device can appropriately be determined. Moreover, in this case, the collimating lens may constitute a plug of an optical cable, and the determination device may further include a reception unit that receives the collimated light collimated by the collimating lens. In such a manner, the mode ratio in the collimated light emitted from the plug of the optical cable can appropriately be determined.

In addition, for example, a notification unit that issues a notification concerning the determination result may be further provided. In such a manner, the mode ratio in the collimated light, such as whether the ratio of the first mode is the threshold or higher and the ratio of the first mode, can easily be recognizable for a user.

According to the present technology described above, a light intensity distribution of collimated light containing a first mode component and a second mode component is acquired. A mode ratio is determined in reference to a slope of a curve that is included in the light intensity distribution on a side where a peak value of light intensity is present with respect to a center positioned at an optical axis of the collimated light and that is located at a portion corresponding to an increase in distances from a distance of the peak value, Appropriate determination of a mode ratio in collimated light in a double mode is achievable, and out-of-specification products are eliminable without use of an expensive part. Accordingly, sufficient communication quality of an optical communication system is guaranteed.

Moreover, another concept of the present technology is directed to a determination method including a process of acquiring a light intensity distribution of collimated light containing a first mode component and a second mode component, and a process of determining a mode ratio in reference to a slope of a curve that is included in the light intensity distribution on a side where a peak value of light intensity is present with respect to a center positioned at an optical axis of the collimated light and that is located at a portion corresponding to an increase in distances from a distance of the peak value.

Further, a further concept of the present technology is directed to a program for causing a computer to execute a determination method that includes a process of acquiring a light intensity distribution of collimated light containing a first mode component and a second mode component, and a process of determining a mode ratio in reference to a slope of a curve that is included in the light intensity distribution on a side where a peak value of light intensity is present with respect to a center positioned at an optical axis of the collimated light and that is located at a portion corresponding to an increase in distances from a distance of the peak value.

BRIEF DESCRIPTION OF DRAWINGS

FIG. 1 is a diagram illustrating an outline of optical communication using spatial join.

FIG. 35 is a diagram illustrating a configuration example of a determination system which determines a mode ratio in collimated light emitted from the connector of the cable as a determination target.

DESCRIPTION OF EMBODIMENT

A mode for carrying out the invention (hereinafter referred to as an "embodiment") will hereinafter be described. Note that the description will be given in the following order.

1. Embodiment
2. Modifications

1. Embodiment

Description of Technology Associated with Embodiment

Figure 1:
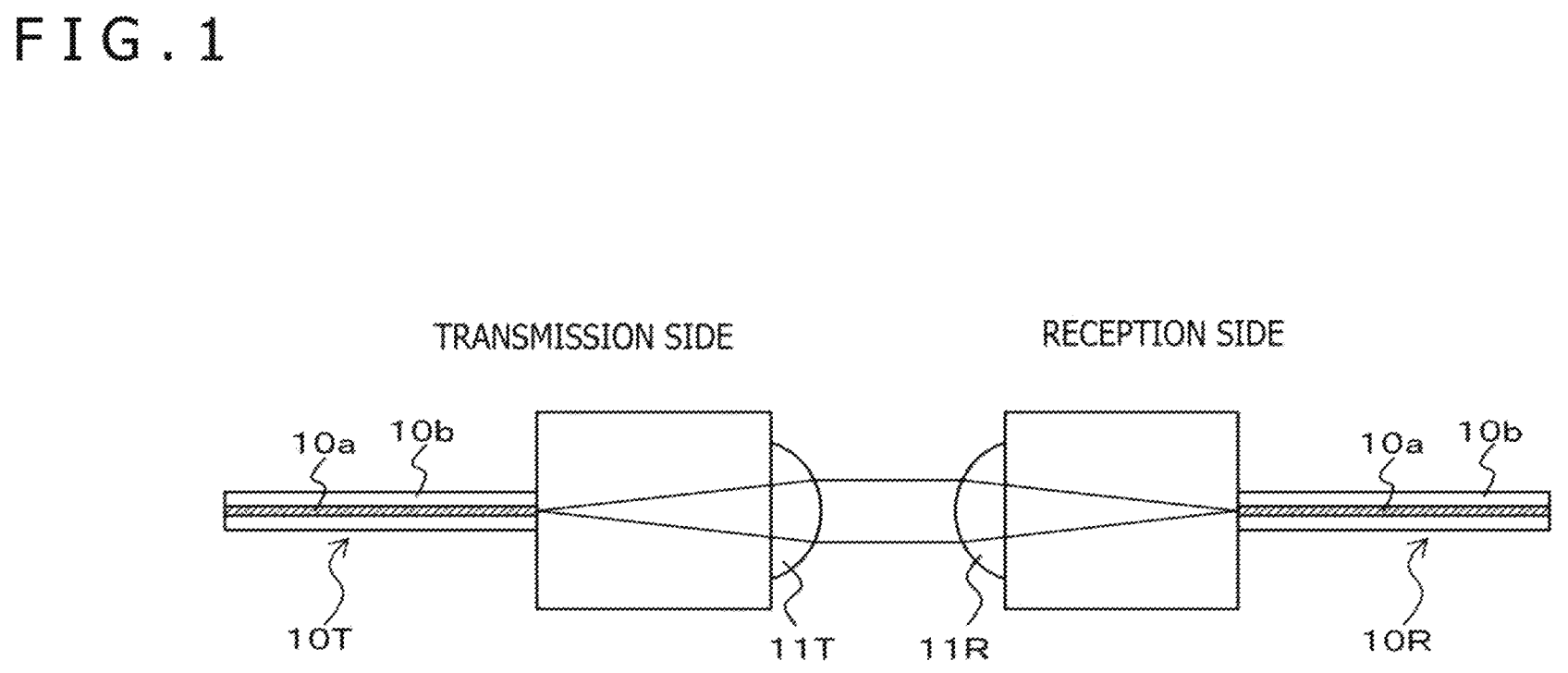

A technology associated with the embodiment will first be described. FIG. 1 illustrates an outline of optical communication using spatial join. In this case, light emitted from an optical fiber 10T on the transmission side is formed into collimated light by a lens 11T, and released therefrom. Subsequently, this collimated light is collected by a lens 11R on the reception side, and introduced into an optical fiber 10R. In a case of this type of optical communication, a great loss of optical power is produced by misalignment particularly in a single-mode fiber. Note that each of the optical fibers 10T and 10R constitutes a double structure which has a core 10*a* corresponding to a central portion and forming an optical path and a clad 10*b* covering surroundings of the core 10*a*.

A basic idea of a mode will next be described. For propagation inside an optical fiber in a single mode, it is necessary to determine a refractive index, a core diameter, and other parameters of the fiber such that only one mode is formed.

Figures 2A, 2B:
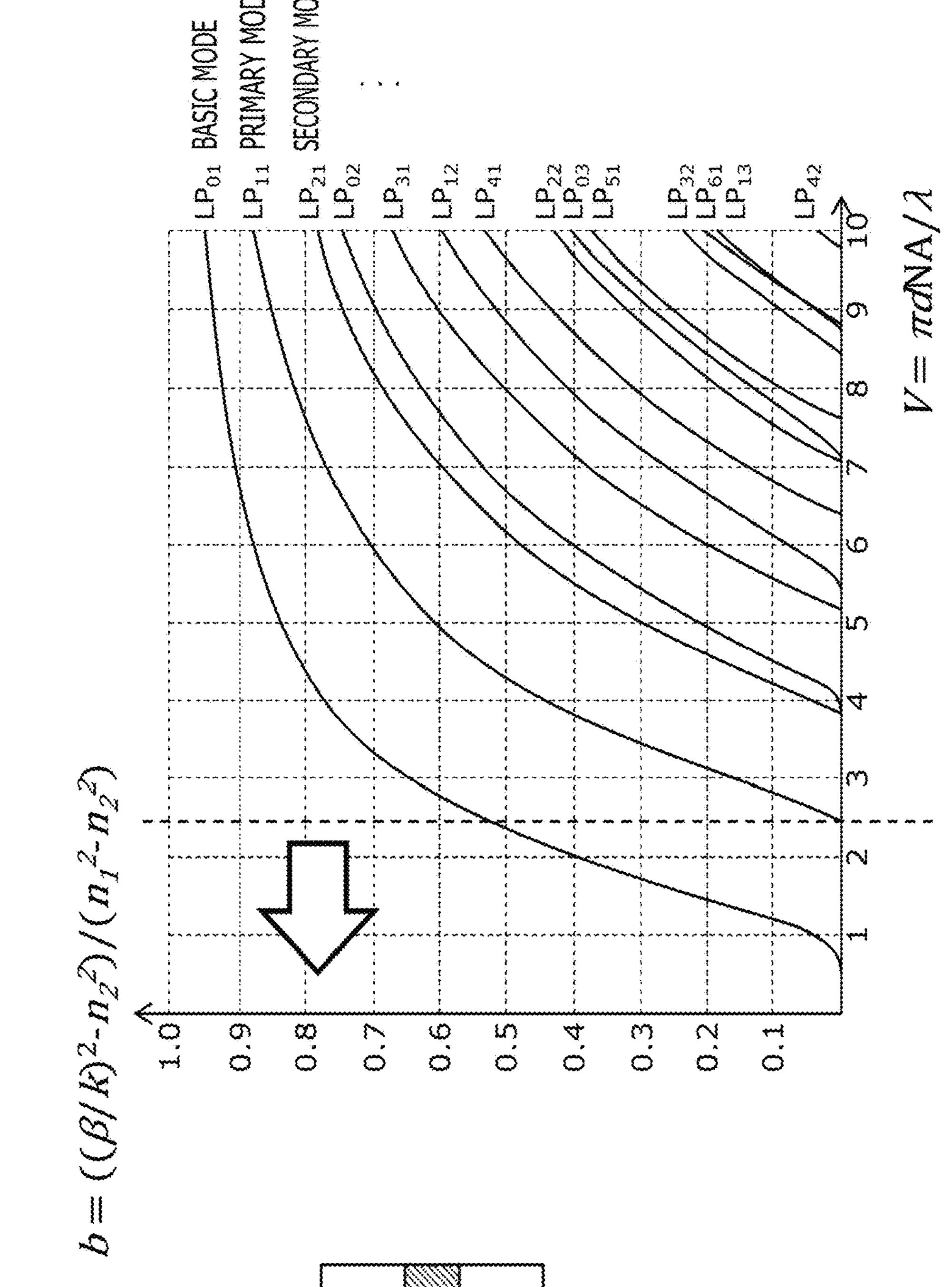
FIGS. 2A and 2B depict diagrams illustrating a basic structure of an optical fiber and LPml modes of a step-type optical fiber.

FIG. 2A illustrates a basic structure of an optical fiber. The optical fiber constitutes such a structure which has a central portion called a core, and a layer called a clad covering the core. In this case, a core refractive index n1 is set to a high value, while a clad refractive index n2 is set to a low value. Light propagates through the closed interior of the core.

FIG. 2B illustrates LPml (Linearly Polarized) modes of a step-type optical fiber, where a normalized propagation constant b is expressed as a function of a normalized frequency V. The vertical axis represents the normalized propagation constant b. In a state prohibiting (cutting off) a certain mode, b is 0. As optical power closed (propagable) within the core increases, b approaches 1. The horizontal axis represents the normalized frequency V, and can be expressed in the following equation (1). In this equation, d, NA, and λ indicate a core diameter, a numerical aperture, and a light wavelength, respectively.

$$V=\pi dNA/\lambda \quad (1)$$

For example, LP11 is cut off when V=2.405. In this state, the mode allowed to be formed is only LP01. Accordingly, a single mode is formed in a state of V=2.405 or lower. Note here that LP01 corresponds to a basic mode (0—order mode), and that LP11, LP21, and following modes correspond to a primary mode, a secondary mode, and following modes.

Figures 3A, 3B:
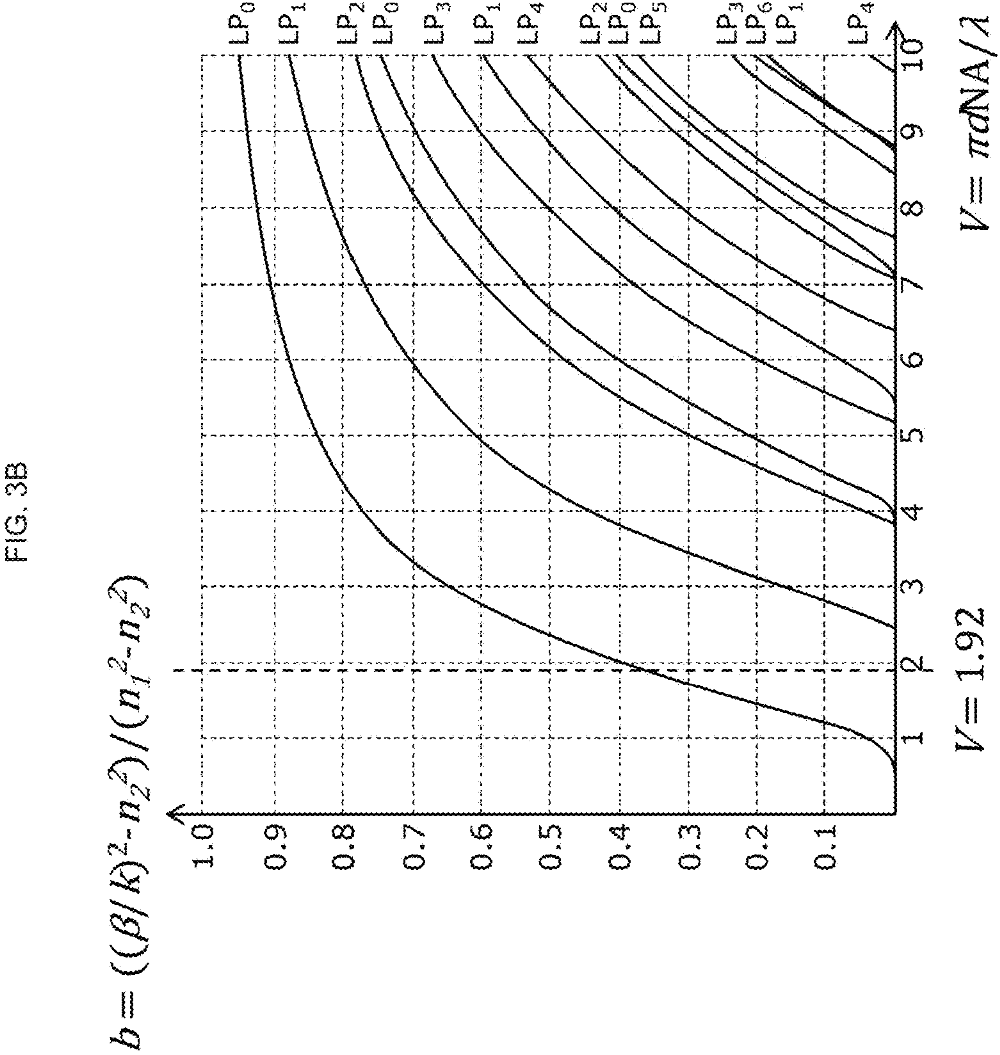
FIGS. 3A and 3B depict diagrams for assuming a normalized frequency V in a typical case of 1310 nm in a single mode.

For example, suppose the normalized frequency V in a case of the single mode and a typical wavelength of 1310 nm as illustrated in FIG. 3A. Assuming here that the core diameter d and the numerical aperture NA are 8 μm and 0.1, respectively, which are typical parameters of a 1310 nm optical fiber, and that a wavelength of light propagating through the fiber is 1310 nm, V=1.92 is calculated from equation (1).

Accordingly, because the normalized frequency V is 2.405 or lower, a single mode is formed where only the basic mode of LP01 is propagated as illustrated in FIG. 3B. Note here that the number of propagable modes increases as the core diameter becomes larger. As a side note, for example, several hundreds of modes are propagable through a typical multimode fiber by setting the core diameter to 50 μm.

In the case of optical communication using spatial join assumed as illustrated in FIG. 1, strict alignment is required between light coupling portions of the transmission side and the reception side due to a small core diameter. Accordingly, such a problem arises that accuracy demanded for achieving accurate optical axis alignment increases.

Methods generally adopted for solving this problem include use of highly accurate parts, and processing of a light input portion for inputting light into the optical fiber for easy introduction of light into the fiber core. However, use of the highly accurate parts is costly, and the portion requiring processing raises processing costs. Accordingly, a connector and a system for single-mode communication generally increases costs.

Figures 4A, 4B:
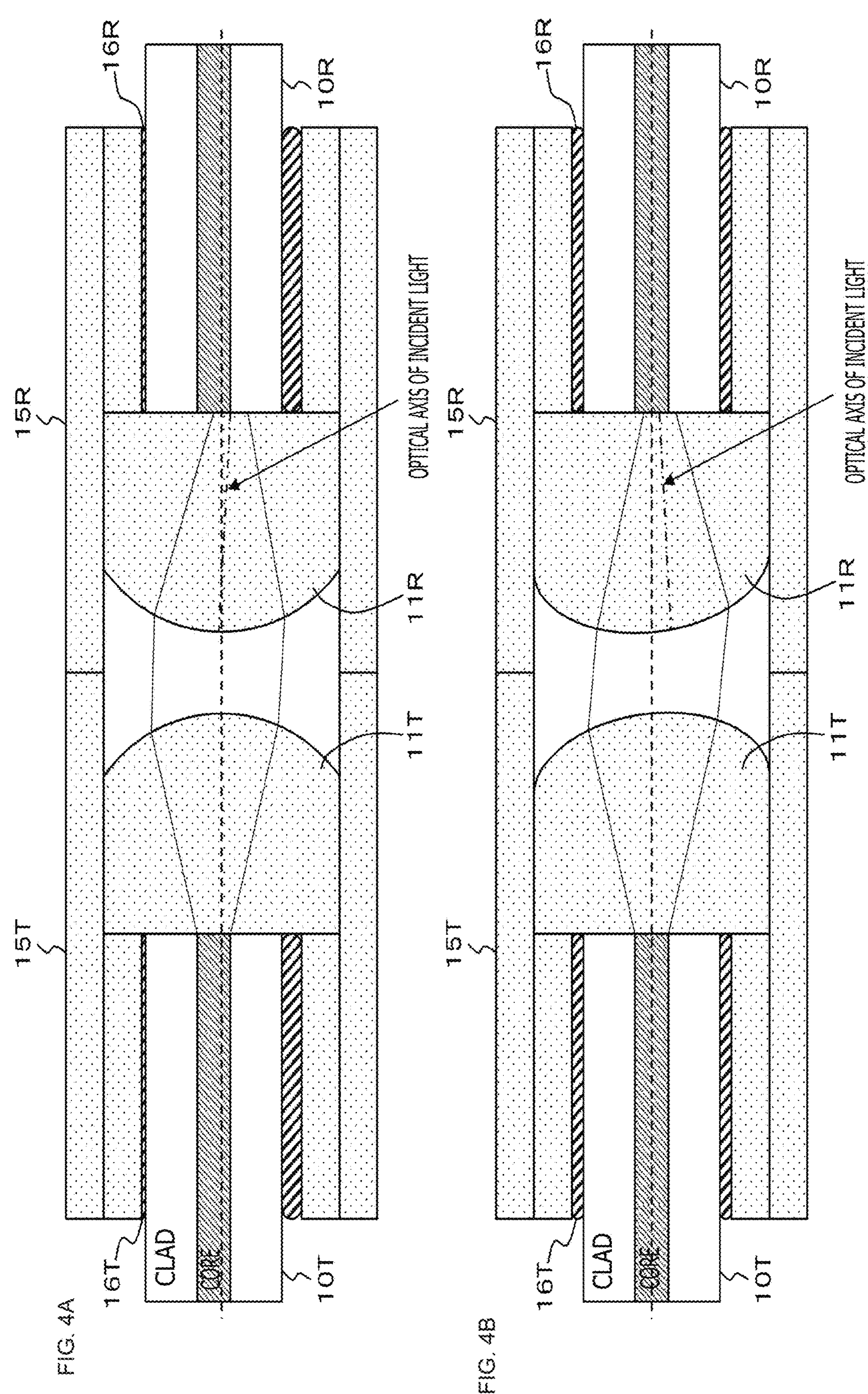
FIGS. 4A and 4B illustrate an example of a factor deteriorating optical axis alignment accuracy.

Each of FIGS. 4A, 4B, 5A, and 5B illustrates an example of a factor deteriorating optical axis alignment accuracy. For example, as illustrated in FIG. 4A, optical axis misalignment is caused by inequality in amounts of fixing members 16T and 16R provided for fixing ferrules 15T and 15R and the optical fibers 10T and 10R. Moreover, for example, as illustrated in FIG. 4B, optical axis misalignment is caused by insufficiency of shaping accuracy for the lenses 11T and 11R.

Figures 5A, 5B:
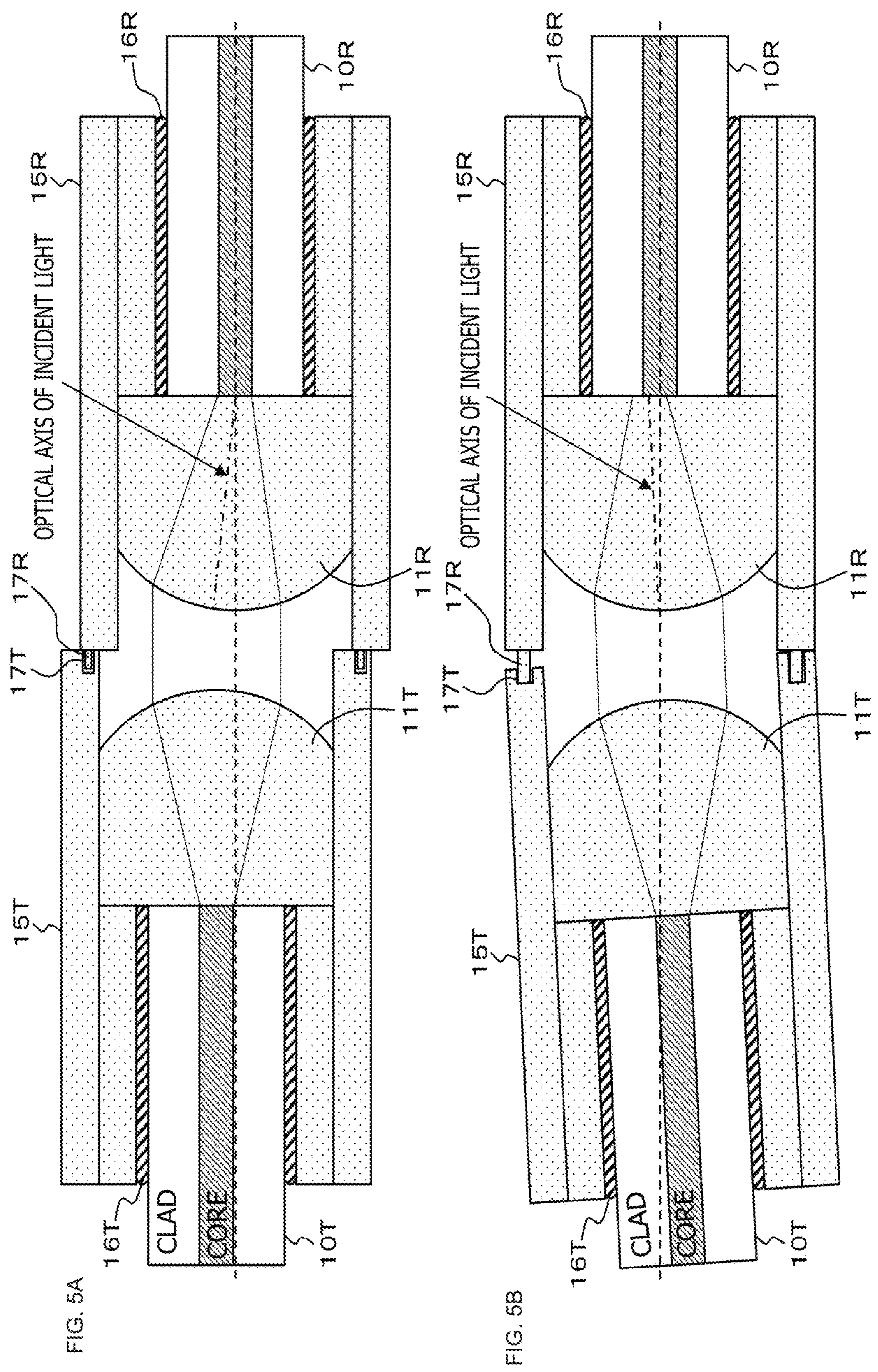
FIGS. 5A and 5B illustrate a different example of the factor deteriorating optical axis alignment accuracy.

Further, as illustrated in FIGS. 5A and 5B, optical axis misalignment is caused by insufficiency of accuracy of an alignment mechanism (recesses 17T, protrusions 17R) formed on the ferrules 15T and 15R, respectively. Note that the protrusions 17R illustrated in FIGS. 5A and 5B are pins in some cases.

The present technology is a technology capable of achieving appropriate determination of a mode ratio in collimated light in a double mode.

Note here that a double-mode optical communication device has an optical waveguide which propagates only a basic mode at a first wavelength, and communicates using light having a second wavelength and containing a basic mode component and also at least a primary mode component. The second wavelength is a wavelength at which the optical waveguide can propagate at least the primary mode along with the basic mode.

Figures 6A, 6B:
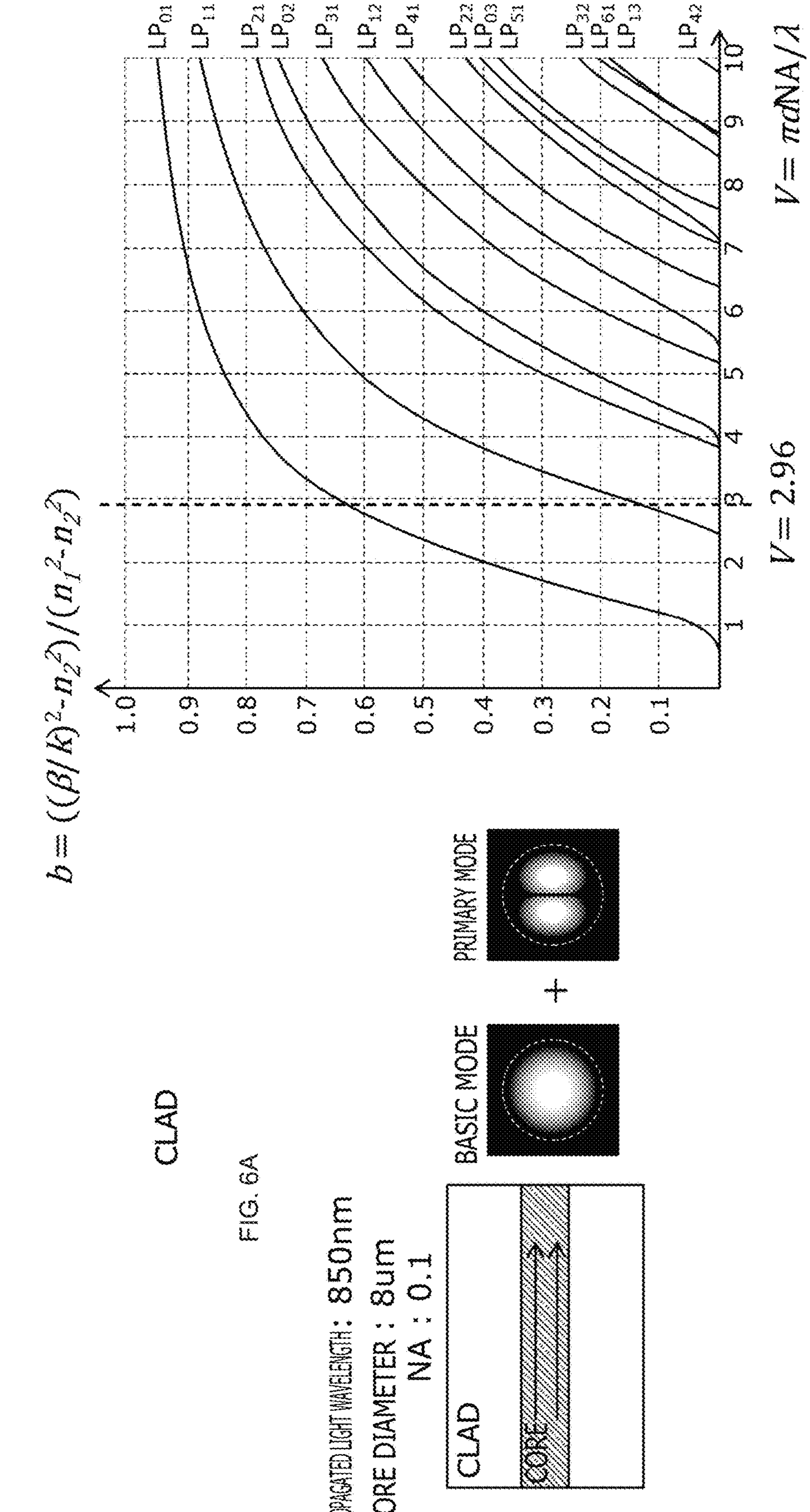
FIGS. 6A and 6B depict diagrams for explaining a fact that a basic mode of LP01 and a primary mode of LP11 are formable in a case where light having a wavelength of 850 nm is input to a 1310 nm single-mode fiber.

The double-mode optical communication device will be explained. For example, in a case where light having a wavelength of not 1310 nm but 850 nm is input to an optical fiber provided in the same condition as in FIG. 3A, the normalized frequency V is 2.96 as illustrated in FIG. 6B. Accordingly, the basic mode of LP01 and the primary mode of LP11 can be formed as illustrated in FIG. 6A.

Figure 7A:
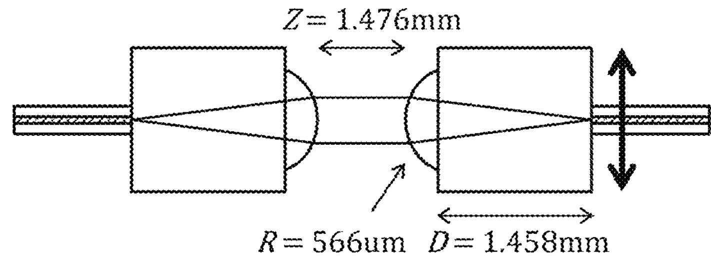
FIGS. 7A and 7B depict diagrams for assuming a case where optical axis misalignment is caused in a condition that only the basic mode of LP01 is formed for input light.
Figure 7B:
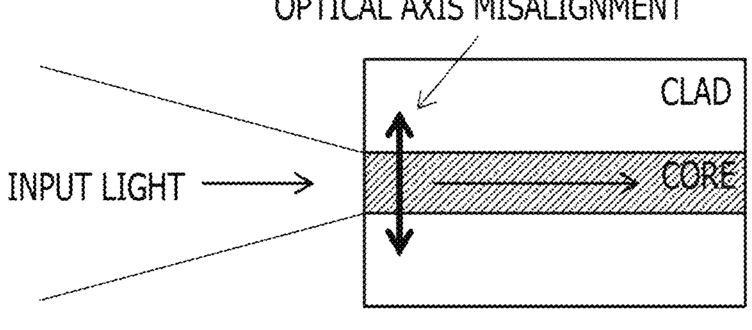

Considered here is a case where a reception-side optical fiber of an optical system assembled as illustrated in FIG. 7A positionally deviates in a vertical direction with respect to an optical axis (see arrows in FIGS. 7A and 7B), i.e., optical axis misalignment is caused, in the condition that only the basic mode of LP01 is formed for input light.

Figure 8:
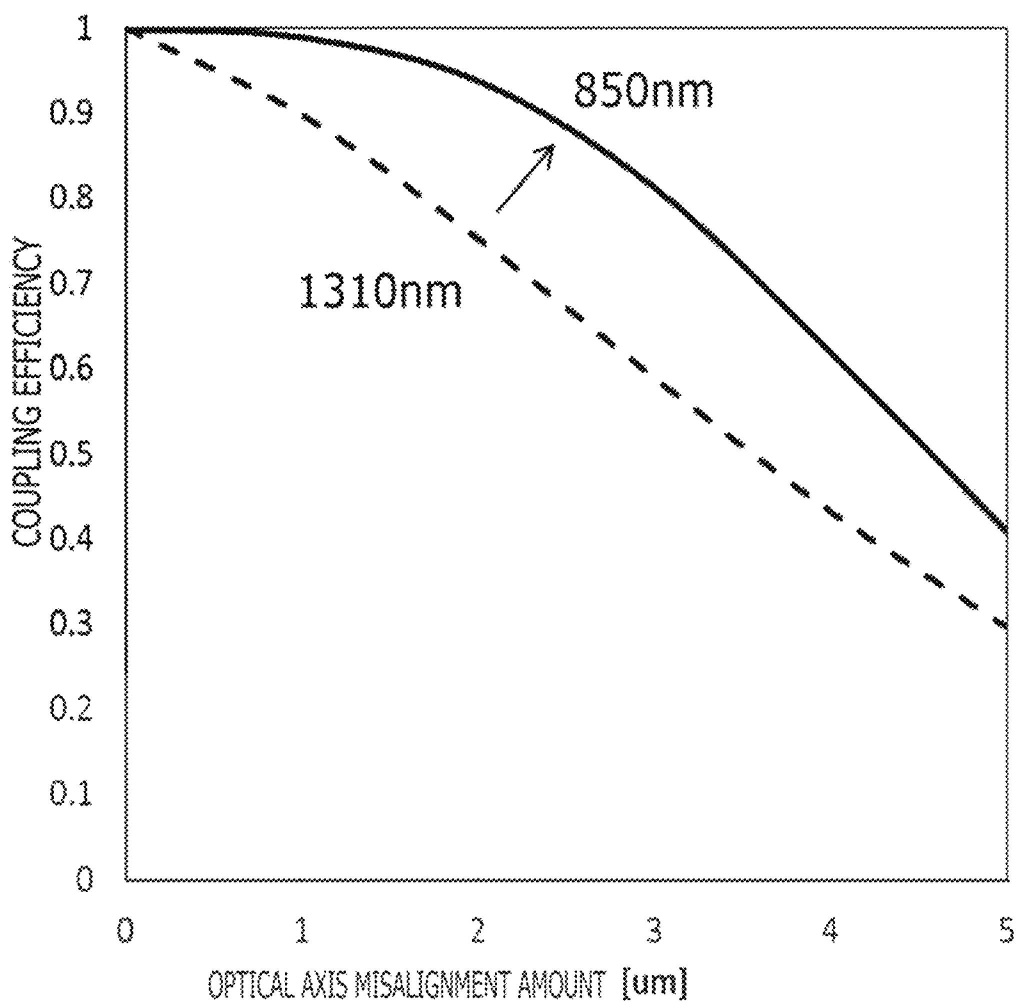
FIG. 8 is a graph indicating a simulation result of loss amounts at wavelengths of 1310 nm and 850 nm of input light.

FIG. 8 is a graph indicating a simulation result of optical power coupling efficiency in such a case. The horizontal axis represents an optical axis misalignment amount, while the vertical axis represents coupling efficiency. In a state of no misalignment, 100% power is propagated into the optical fiber, and the coupling efficiency becomes 1. However, in a case where only 50% power of input light is propagated into the optical fiber, for example, the coupling efficiency is 0.5.

Comparing the wavelengths of 1310 nm and 850 nm of input light reveals that the input light having 850 nm exhibits preferable characteristics. This is because not only the basic mode but also the primary mode is propagable in the case of 850 nm in comparison with the case of 1310 nm where only the basic mode is propagable (see FIG. 6A).

Figures 9A, 9B:
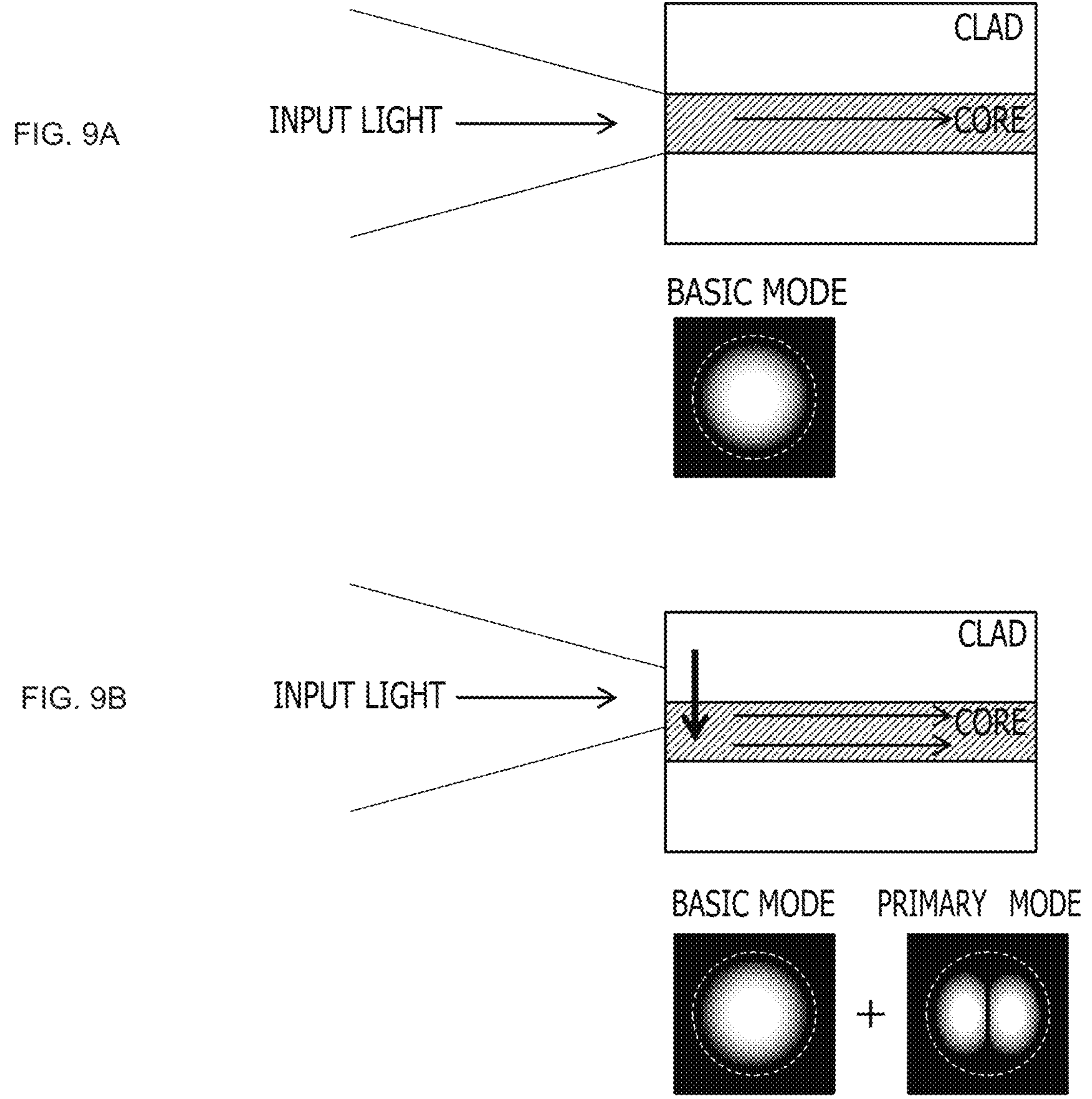
FIGS. 9A and 9B depict diagrams illustrating a fact that only the basic mode is formed for input light in a state of absence of optical axis misalignment and a fact that a part of the basic mode is converted into the primary mode in a state of presence of optical axis misalignment.

In other words, as illustrated in FIG. 9A, only the basic mode is formed for input light in the state of absence of optical axis misalignment. Meanwhile, in the state of presence of optical axis misalignment, a part of the basic mode is converted into the primary mode by use of a phase difference produced by a refractive index difference between the clad and the core as illustrated in FIG. 9B. This primary mode is not propagable in the case of 1310 nm, but is propagable in the case of 850 nm. Accordingly, characteristics improve in the case of 850 nm.

Figure 10:
FIG. 10 is a graph for explaining conversion of the basic mode into the primary mode according to misalignment.
Figure 10:
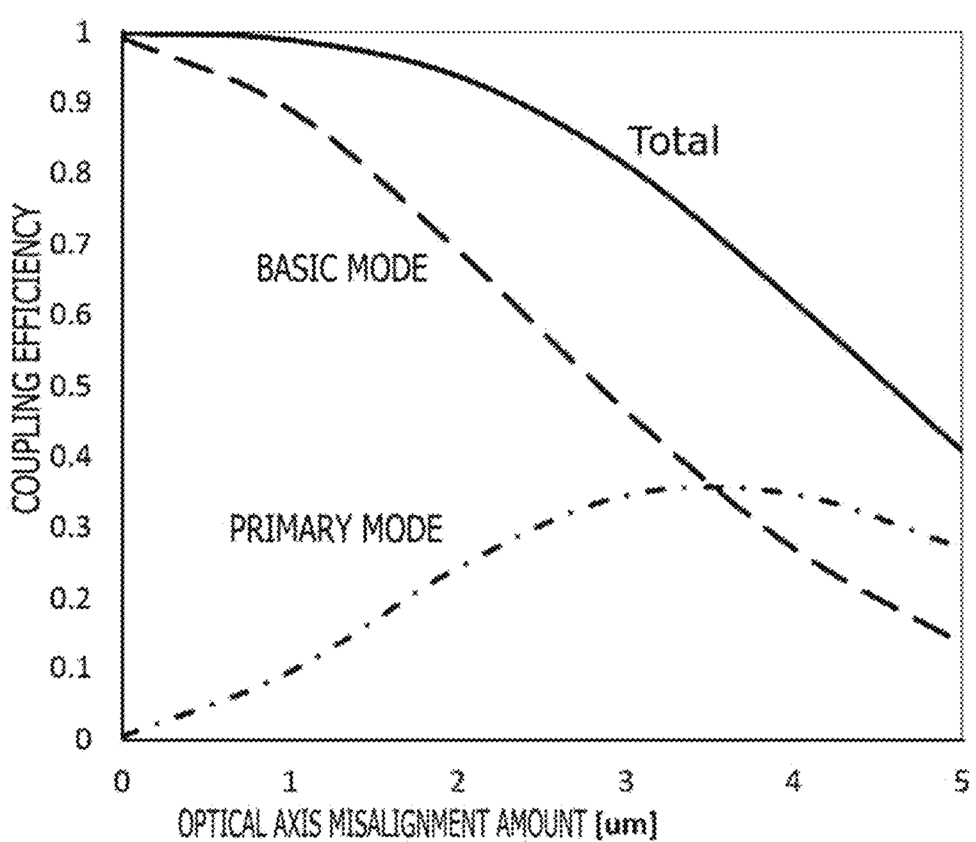

A basic mode (0-order mode) component and a primary mode component are separately presented in a graph in FIG. 10. The sum of these components is indicated as a total (Total) curve. Since only the basic mode is formed for the input light, it is recognizable that the basic mode is converted into the primary mode according to misalignment. Meanwhile, in the case of 1310 nm, only the basic mode is propagable as illustrated in FIG. 3A. Accordingly, the basic mode simply decreases as illustrated in FIG. 8.

According to comparison between 1310 nm and 850 nm in FIG. 8, accuracy associated with misalignment can be lowered by approximately 1.8 times for coupling efficiency of 0.8 (approximately −1 dB), and by approximately 2.35 times for coupling efficiency of 0.9 (approximately −0.5 dB).

As can be understood from the above, improvement of coupling efficiency of optical power is achievable by the optical fiber being configured to communicate by use of light having the first wavelength (e.g., 1310 nm) at which only the basic mode is propagable and light having the second wavelength (e.g., 850 nm) at which at least the primary mode is propagable along with the basic mode.

Figures 11A, 11B:
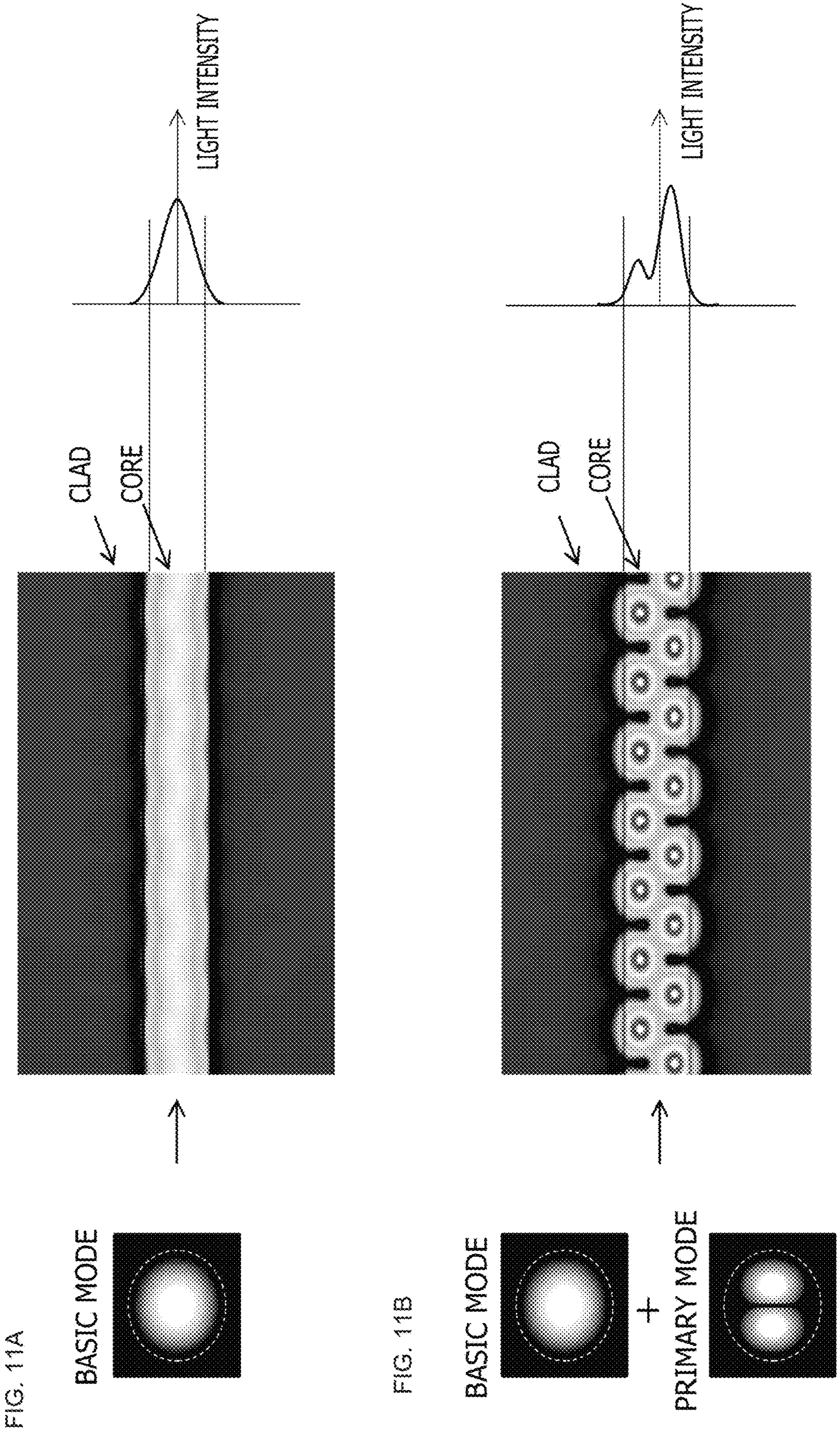
FIGS. 11A and 11B depict diagrams illustrating a simulation of an intensity distribution of light transmitted inside an optical fiber.

Each of FIGS. 11A and 11B are diagrams illustrating a simulation of an intensity distribution of light transmitted inside an optical fiber. FIG. 11A indicates an example of a case of transfer of light having only a basic mode component. In this case, light intensity is highest at the center of the core of the optical fiber, and decreases with nearness to the clad. Note that a light intensity distribution presented on the right side indicates a light intensity distribution at an output end face of the optical fiber.

FIG. 11B indicates an example of a case of transfer of light having a basic mode component and a primary mode component. In this case, a high-intensity portion alternately appears in one direction and the other direction with respect to the center of the core, or in an upper direction and a lower direction in the example of the figure. Note that a light intensity distribution presented on the right side indicates a light intensity distribution at an output end face of the optical fiber.

Figure 12:
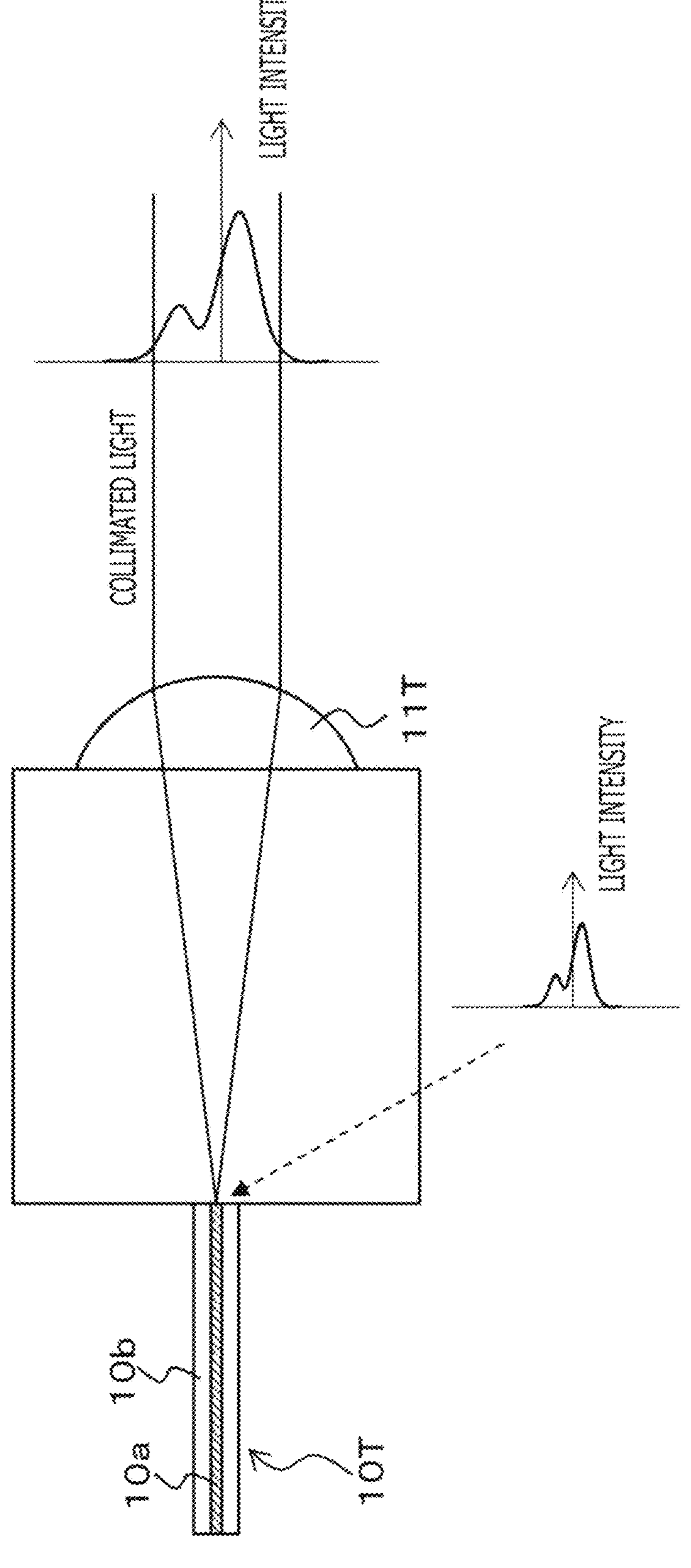
FIG. 12 is a diagram illustrating an example of a light intensity distribution shape in a case where light emitted from an output end face of the optical fiber is formed into collimated light and released therefrom.

FIG. 12 illustrates an example of a light intensity distribution shape in a case where light emitted from the output end face of the optical fiber 10T is formed into collimated light by the lens 11T and released therefrom. In this case, the light is propagated in a space while maintaining the light intensity distribution shape at the output end face of the optical fiber 10T. Accordingly, the light intensity distribution shape of the collimated light has a similar shape.

Figure 13:
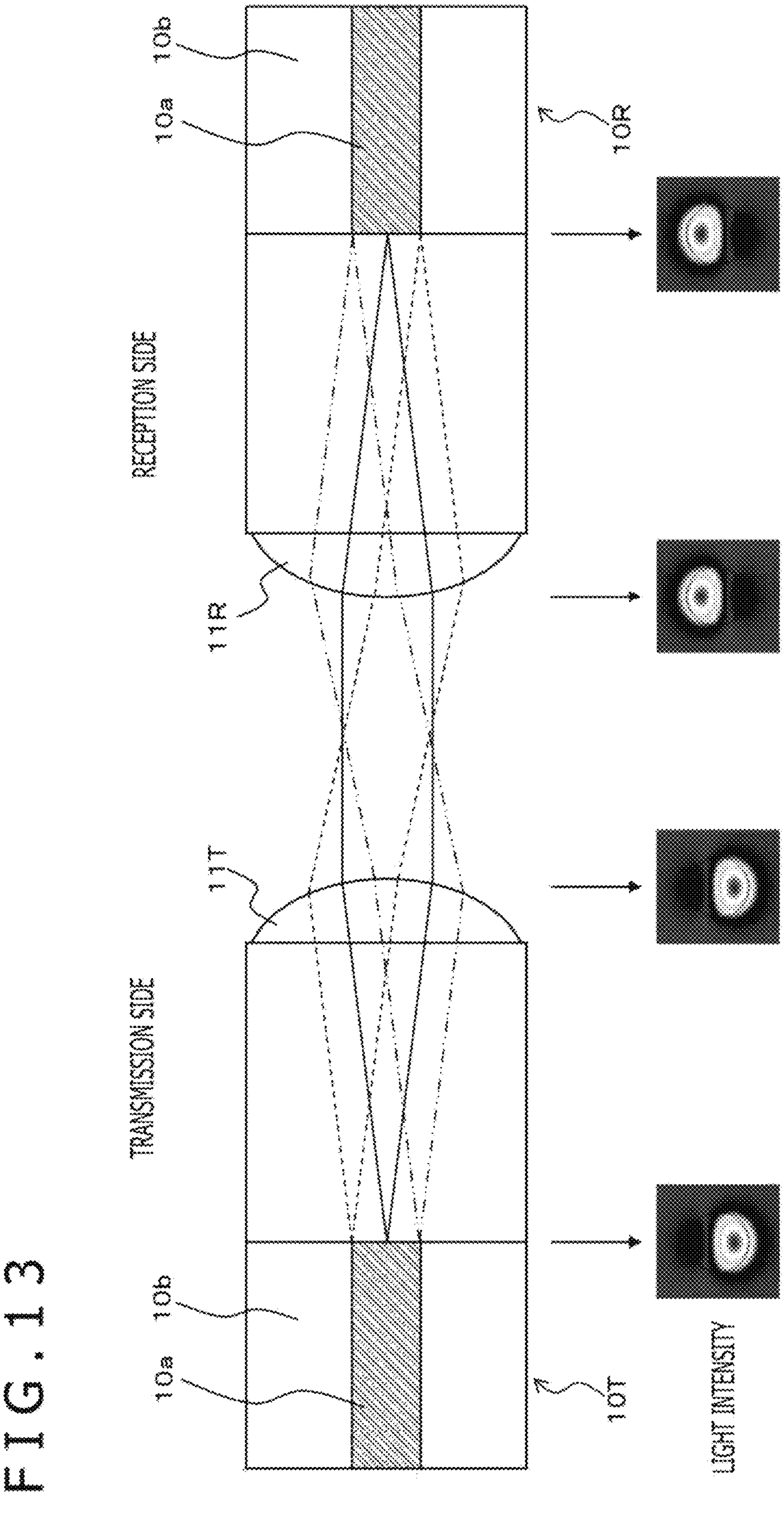
FIG. 13 is a diagram illustrating details of an optical path in spatial join and an example of light intensity distributions at respective portions.

FIG. 13 illustrates details of an optical path in spatial join and an example of light intensity distributions at respective portions. In this figure, parts similar to corresponding parts in FIG. 1 are given identical reference signs. Light emitted from the center of the core 10*a* of the optical fiber 10T on the transmission side expands at a certain angle as indicated by solid lines, and is then collimated by the lens (collimating lens) 11T on the transmission side, collected by the lens (collection lens) 11R on the reception side, and joined to the center of the core 10*a* of the optical fiber 10R on the reception side.

Meanwhile, light emitted from an upper end, in the figure, of the core 10*a* of the optical fiber 10T on the transmission side expands at a certain angle as indicated by broken lines, and the optical path of the light is changed by the lens (collimating lens) 11T on the transmission side. However, in the state of a light source deviating from an ideal point at the core center, the light travels in a diagonally downward direction, and is then collected by the lens (collection lens) 11R on the reception side and joined to a lower end of the core 10*a* of the optical fiber 10R on the reception side.

Similarly, light emitted from the lower end, in the figure, of the core 10*a* of the optical fiber 10T on the transmission side expands at a certain angle as indicated by two-dot chain lines, and the optical path of the light is changed by the lens (collimating lens) 11T on the transmission side. However, in the state where the light source deviates from an ideal point at the core center, the light travels in a diagonally upward direction, and is then collected by the lens (collection lens) 11R on the reception side and joined to the upper end of the core 10*a* of the optical fiber 10R on the reception side.

In this case, the shape of the light intensity distribution at the output end face of the optical fiber 10T on the transmission side is maintained until the light reaches the lens (collimating lens) 11T on the transmission side. However, the shape of the distribution is reversed before the light having passed through the lens (collimating lens) 11T reaches the lens (collection lens) 11R on the reception side.

Figure 14:
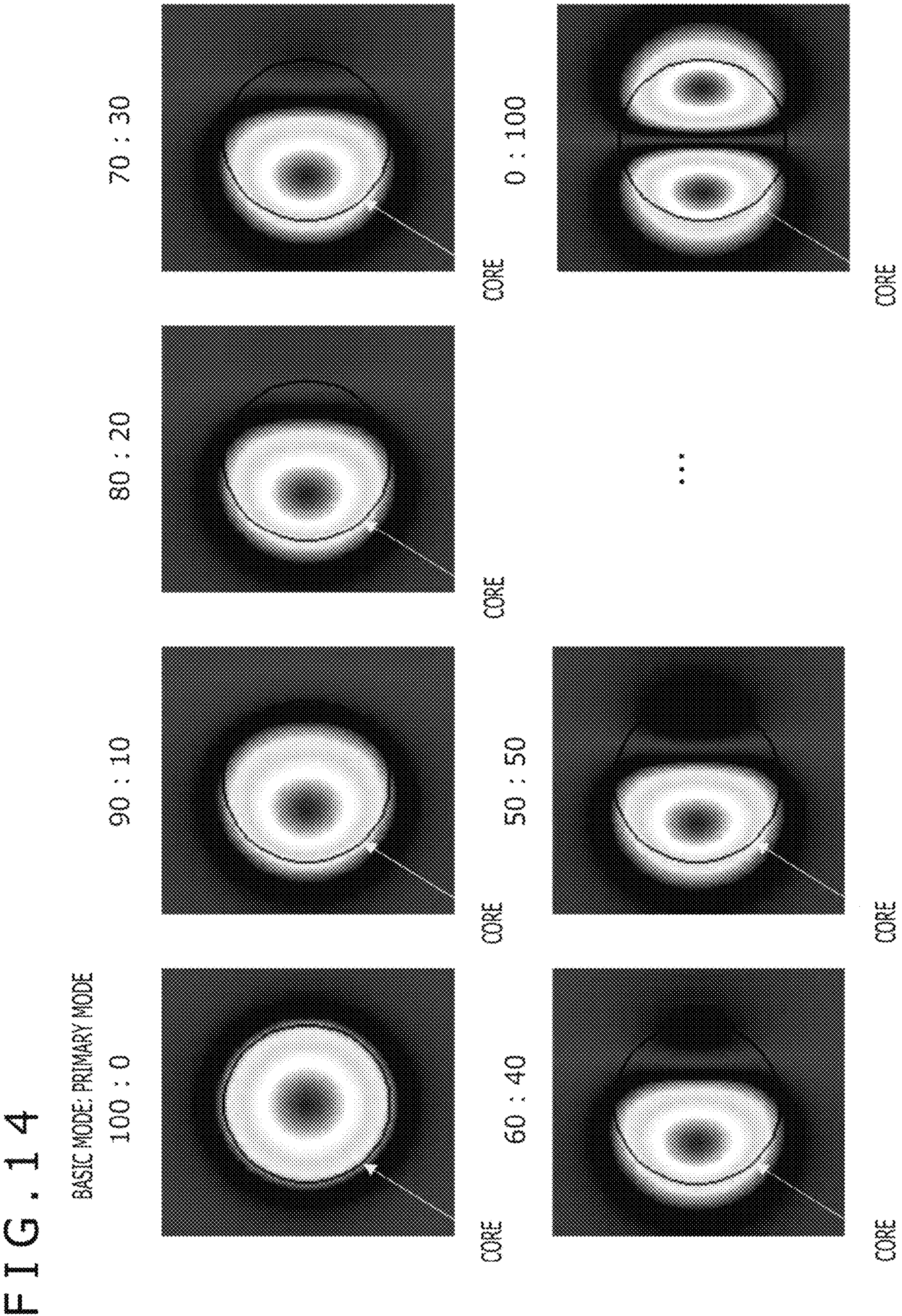
FIG. 14 depicts diagrams illustrating examples of light intensity distributions in a case of a change of a ratio of the basic mode to the primary mode, corresponding to a state of a peak value of light intensity most deviating from an optical center.

FIG. 14 illustrates examples of light intensity distributions in a case where the ratio of the basic mode to the primary mode is varied, corresponding to a state of a peak value of light intensity most deviating from the optical center. The example illustrated in the figure indicates a light intensity distribution at the output end face of the optical fiber 10T on the transmission side. A solid-line circular frame represents an outer circumference of the core. In the example illustrated in the figure, a numeral such as 100:0 indicates the ratio of the basic mode to the primary mode expressed in percentage. As illustrated in the figure, highest light intensity, i.e., the degree of deviation of the peak value from the center of the optical axis, is variable according to the ratio of the basic mode to the primary mode.

Figures 15A, 15B:
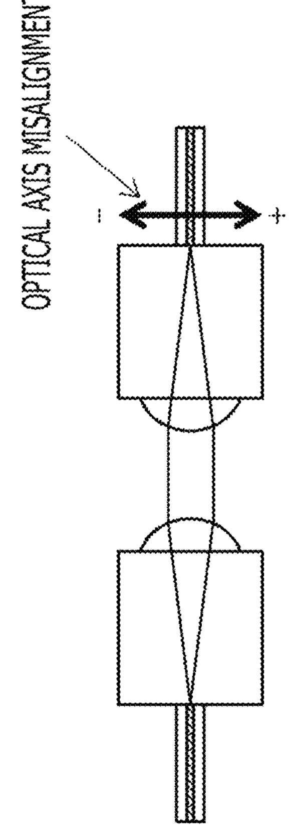
FIGS. 15A and 15B depict diagrams for examining a case where a reception-side optical fiber positionally deviates in a vertical direction from an optical axis.

Considered here is a case where a reception-side optical fiber of an optical system assembled as illustrated in FIG. 15A positionally deviates in the vertical direction from the optical axis (see arrows in FIGS. 15A and 15B), i.e., optical axis misalignment is caused.

Figures 16A, 16B:
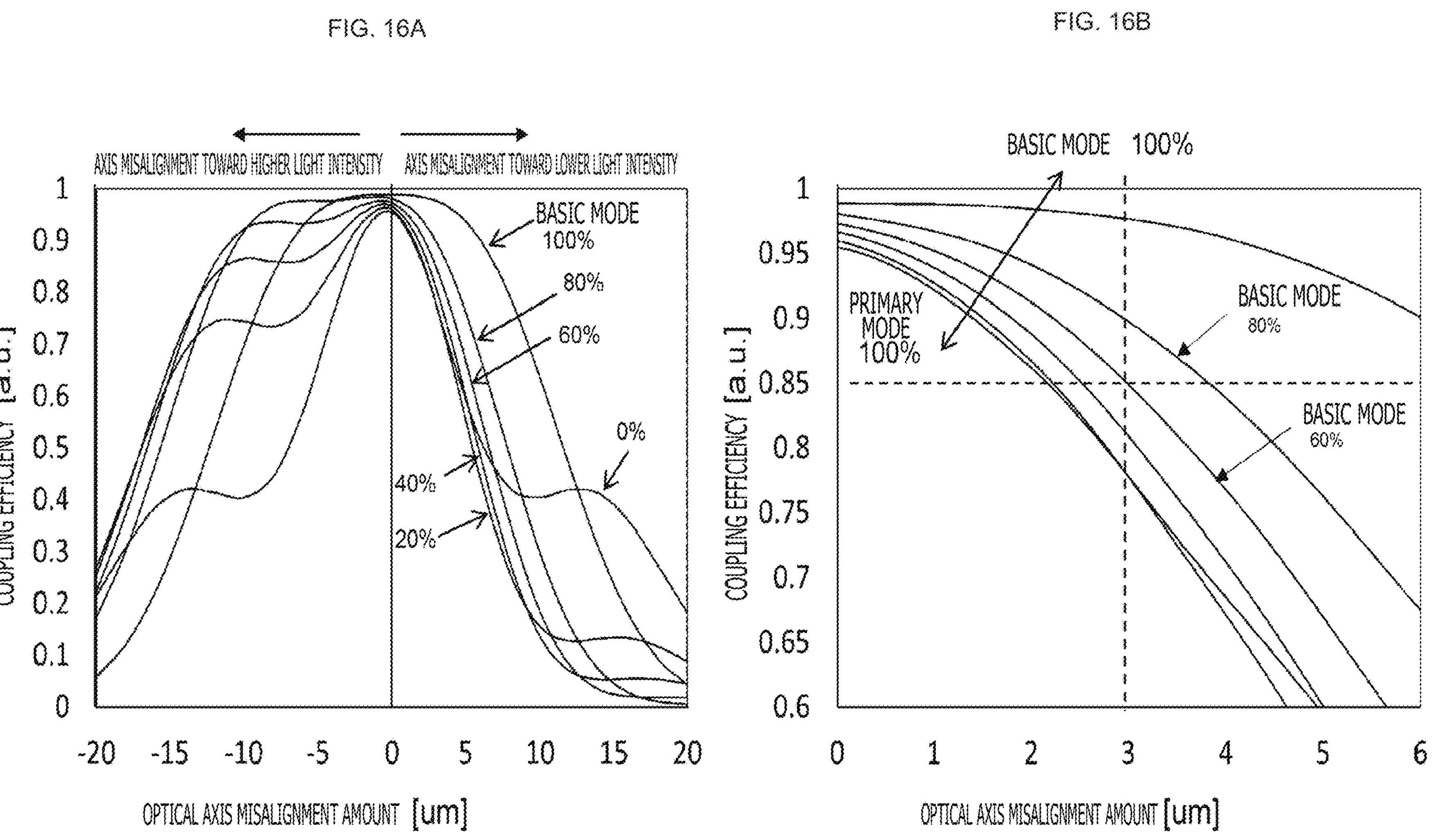
FIGS. 16A and 16B depict graphs indicating a simulation result of optical power coupling efficiency in a case where the reception-side optical fiber positionally deviates in the vertical direction from the optical axis.

FIG. 16A is a graph indicating a simulation result of optical power coupling efficiency in such a case. The horizontal axis represents an optical axis misalignment amount, while the vertical axis represents normalized coupling efficiency. FIG. 16B is an enlarged illustration of a part of the positive amounts of axis misalignment. When axis misalignment is caused toward lower light intensity, a greater coupling loss of optical power is produced than in a case of axis misalignment caused toward higher light intensity. According to the example illustrated in the figure, ratios are presented at intervals of 20% from a ratio of 100% of the basic mode to a ratio of 0% of the basic mode (100% of the primary mode). It is also recognizable from the figure that the coupling loss of optical power tends to decrease as the ratio of the basic mode increases.

Assuming here that loss tolerance is 15% in the state of the axis misalignment amount of 3 μm, it is obvious that an out-of-specification condition is produced when the ratio of the basic mode is lower than 60% (see FIG. 16B). Accordingly, 60% or higher is required for the ratio of the basic mode to guarantee stable communication quality in this case.

A possible method for determining the mode ratio is such a method which separates power for each mode by using a mode splitter or the like, evaluates the power for each mode, and determines the mode ratio. According to this method, however, the mode splitter or the like is difficult to provide at low cost, and hence, easy implementation is difficult to achieve.

The present technology is a technology capable of determining a mode ratio in collimated light in a double mode without using an expensive part such as a mode splitter.

Figures 17A, 17B, 17C, 17D:
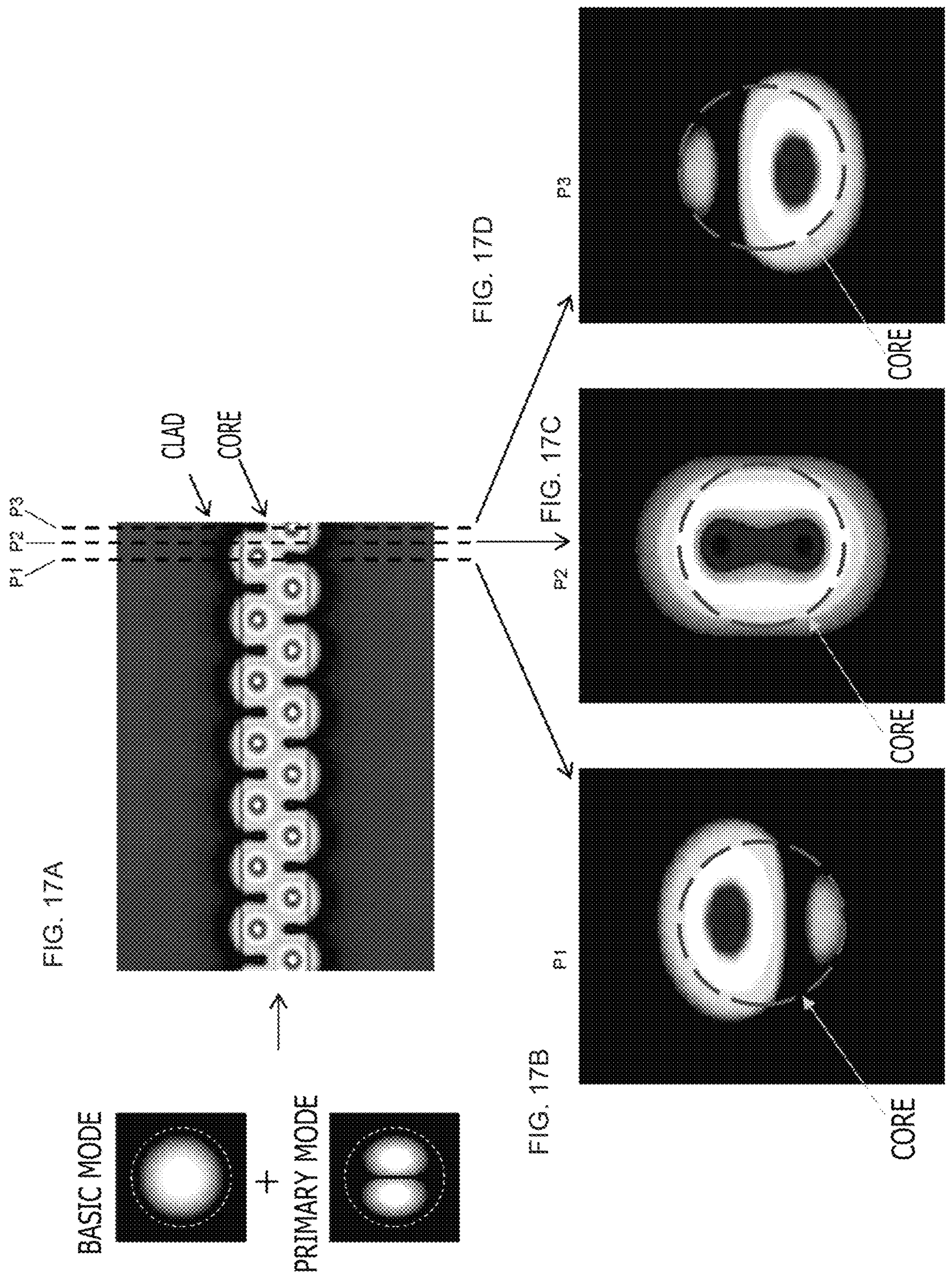
FIGS. 17A, 17B, 17C, and 17D depict diagrams of a simulation of a light intensity distribution in a case of transfer of light which has a basic mode component and a primary mode component through the inside of the fiber, and others.

FIG. 17A is a diagram presenting a simulation of a light intensity distribution in a case of transfer of light which has a basic mode component and a primary mode component (the ratio of the basic mode to the primary mode is 50:50) through the inside of the fiber, as in the case described above in FIG. 11B. FIGS. 17B, 17C, and 17D indicate light intensity distributions at the output end face of the optical fiber in a case of being taken at positions P1, P2, and P3, respectively. Note that each of circles indicated by broken lines in FIGS. 17B, 17C, and 17D indicates the outer circumference of the core.

The light intensity distribution at the output end face of the optical fiber is variable according to the propagation situation of light inside the optical fiber. Accordingly, each of the light intensity distributions in FIGS. 17B, 17C, and 17D can be produced at the output end face of the optical fiber. While FIGS. 17A, 17B, 17C, and 17D indicate the case where the ratio of the basic mode and the primary mode is 50:50 as described above, the light intensity distribution at the output end face of the optical fiber is similarly variable according to the propagation situation of light inside the optical fiber even at a different ratio of the basic mode to the primary mode.

Figures 18A, 18B:
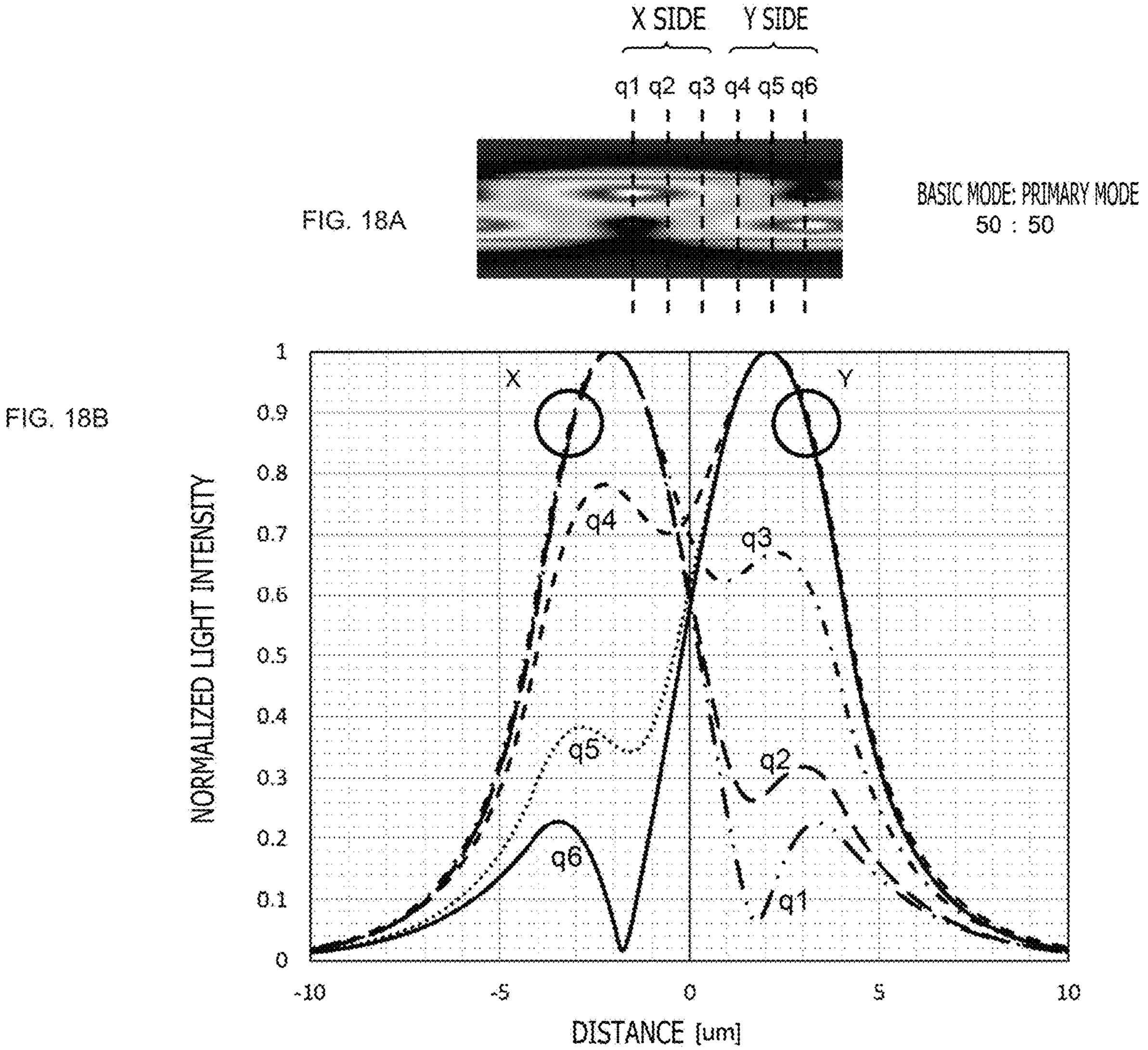
FIGS. 18A and 18B depict diagram including a graph of light intensity distributions at six cross sections q1 to q6 in a transition of the light intensity distribution inside the optical fiber.
Figures 19A, 19B, 19C, 19D:
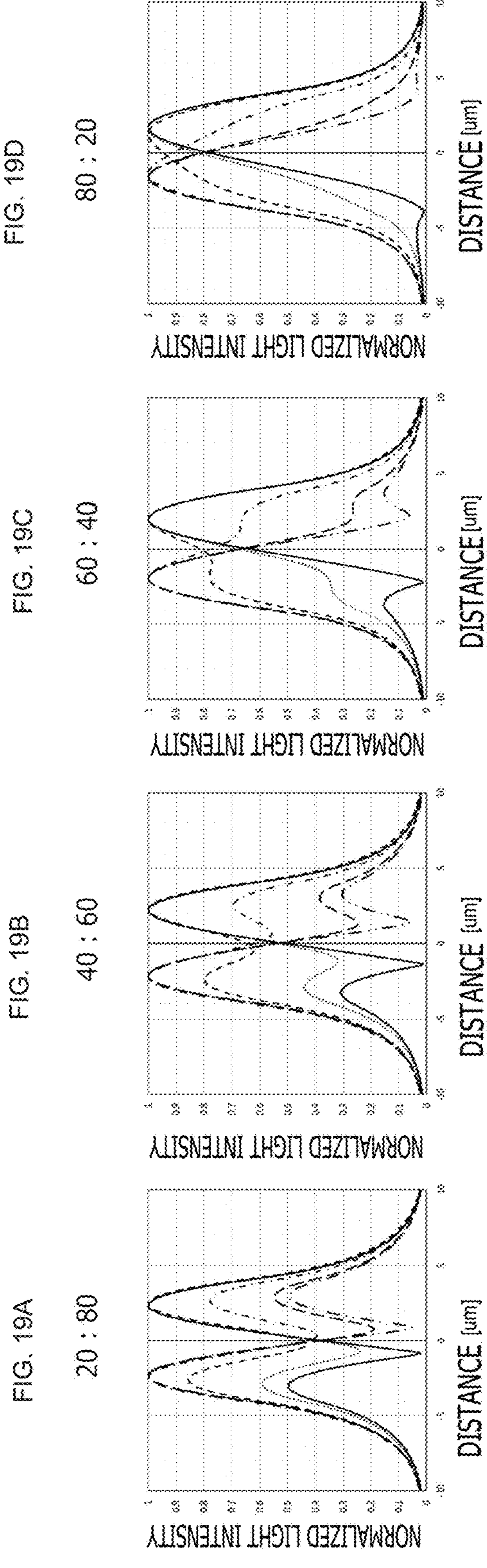
FIGS. 19A, 19B, 19C, and 19D depict diagrams of graphs of light intensity distributions at the six cross sections q1 to q6 in the transition of the light intensity distribution inside the optical fiber at respective mode ratios of the basic mode to the primary mode.

FIG. 18A is a diagram presenting a simulation of a light intensity distribution in a case of transfer of light which has a basic mode component and a primary mode component (the ratio of the basic mode to the primary mode is 50:50) through the inside of the optical fiber, as in the case described above in FIG. 17B.

FIG. 18B is a graph of light intensity distributions at six cross sections q1 to q6 in a transition of the light intensity distribution inside the optical fiber in FIG. 18A. The horizontal axis represe60s a direction perpendicular to the axial direction of the optical fiber, or a position in the up-down direction in the example of the figure, while the vertical direction represents light intensity normalized such that a peak value becomes a predetermined value, or 1 in this example.

As can be recognized from this example, a peak value is located on the negative side with respect to the center (0) in the graph illustrated in FIG. 18B for each of the three cross sections that are located on the X side and that have high light intensity on the upper side in the transition of the light intensity in FIG. 18A. Each of the three intensity distributions decreases in a similar curve as the distance from the distance of the peak value increases. Conversely, as can be recognized from this example, a peak value is located on the positive side with respect to the center (0) in the graph illustrated in FIG. 18B for each of the three cross sections located on the Y side having high light intensity on the lower side in the transition of the light intensity in FIG. 18A. Each of the three intensity distributions decreases in a similar curve as the distance from the distance of the peak value increases.

FIGS. 19A, 19B, 19C, and 19D are graphs of light intensity distributions at six cross sections similar to those in FIG. 18B. While FIG. 18B indicates the case where the ratio of the basic mode to the primary mode is 50:50, FIGS. 19A, 19B, 19C, and 19D indicate cases of 20:80, 40:60, 60:40, and 80:20, respectively. As apparent from these figures, a similar tendency is exhibited even when the mode ratio is varied.

The present technology utilizes this phenomenon to determine a mode ratio in collimated light in a double mode.

"Mode Ratio Determination Method"

Described will be a method for determining a mode ratio in collimated light in a double mode.

Figure 20:
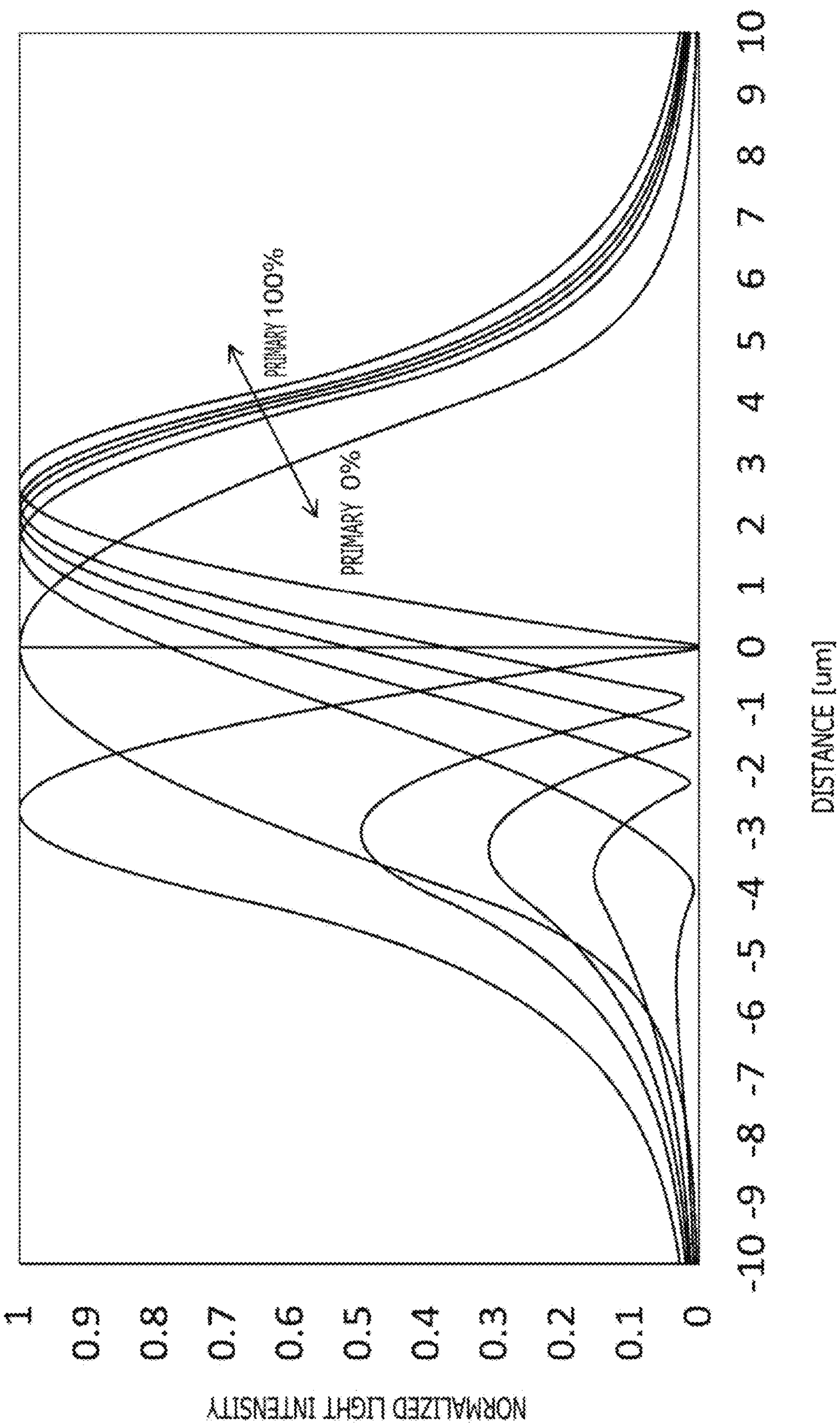
FIG. 20 is a graph indicating light intensity distributions obtained at the respective mode ratios and overlapped with each other, each distribution having a peak value (highest light intensity) on the positive side with respect to the center.

FIG. 20 is a graph indicating light intensity distributions obtained at the respective mode ratios and overlapped with each other, each distribution having a peak value (highest light intensity) on the positive side with respect to the center. The horizontal axis and the vertical axis are axes defined similarly to those in FIG. 18B. Specifically, the horizontal axis represents a position in the direction perpendicular to the axial direction of the optical fiber, while the vertical direction represents light intensity normalized such that a peak value becomes a predetermined value, or 1 in this example. The light intensity distributions indicated in the example of the figure correspond to 0:100, 20:80, 40:60, 60:40, 80:20, and 100:0 designated as the ratio of the basic mode to the primary mode. As can be recognized from this figure, a curve at a portion corresponding to an increase in distances from the distance of the peak value has a slightly different slope depending on the mode ratio.

The present technology determines the mode ratio on the basis of this slope of the curve at the portion corresponding to the increase in distances from the distance of the peak value in the light intensity distribution. In this case, possible is such a method which directly calculates this slope of the curve and determines the mode ratio in reference to the calculated result, for example. However, the mode ratio is determined by using the following method here.

Figure 21:
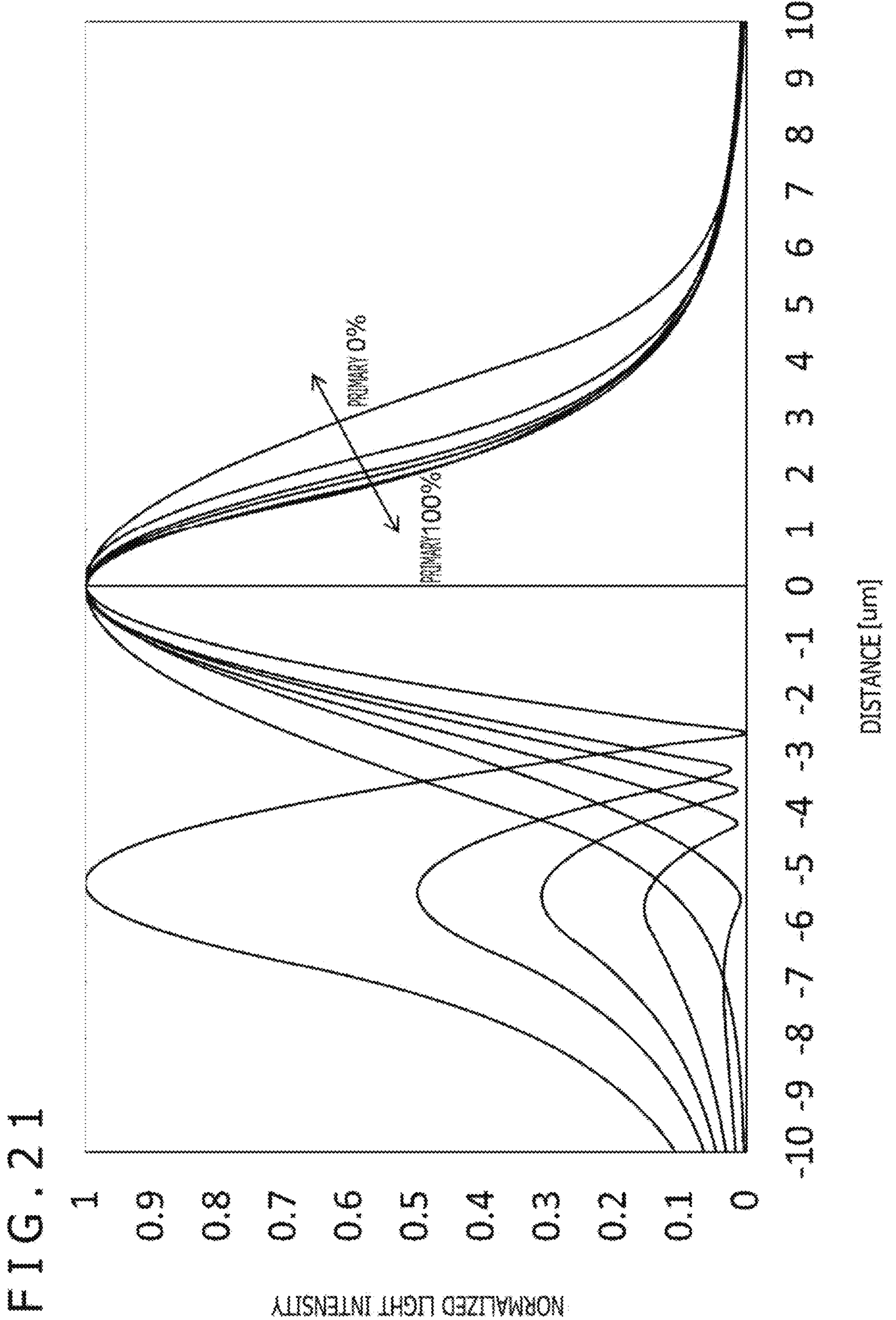
FIG. 21 is a diagram illustrating a light intensity distribution in a case where a distance of the peak value is set to a predetermined value (0) at the respective mode ratios.

FIG. 21 is a graph indicating a case where the distance of the peak value is set to a predetermined value, or 0 in this example, in the light intensity distribution at each of the mode ratios. According to this graph, the curves come to overlap with each other as the ratio of the primary mode increases. In this case, each of the curves corresponding to the mode ratios is difficult to observe at the large ratio of the primary mode, and hence, accurate determination of the mode ratio is difficult to achieve.

Figure 22:
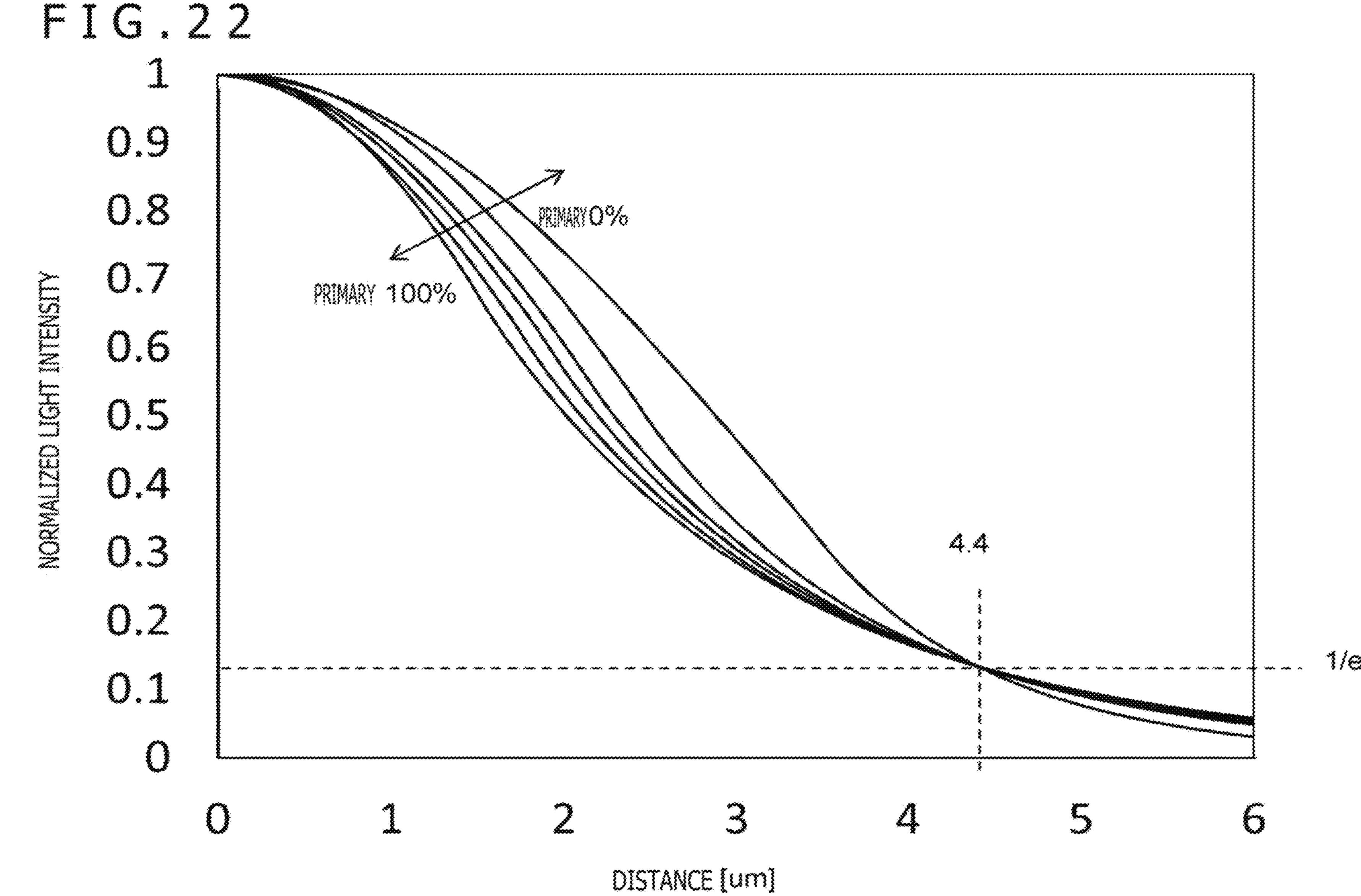
FIG. 22 is a diagram illustrating light intensity distributions in a case where a distance corresponding to light intensity of a predetermined value (1/e^2) is adjusted to a predetermined distance (4.4 μm) at the respective mode ratios.

Accordingly, as illustrated in FIG. 22, the distance at which light intensity becomes a predetermined value, or 1/e^2 in this example, is adjusted to a predetermined distance, or 4.4 μm in this example, in the light intensity distributions of the respective mode ratios. In such a manner, each of the curves corresponding to the mode ratios is easily observable even at the large ratio of the primary mode. Accordingly, accurate determination of the mode ratio is easily achievable.

Figure 23:
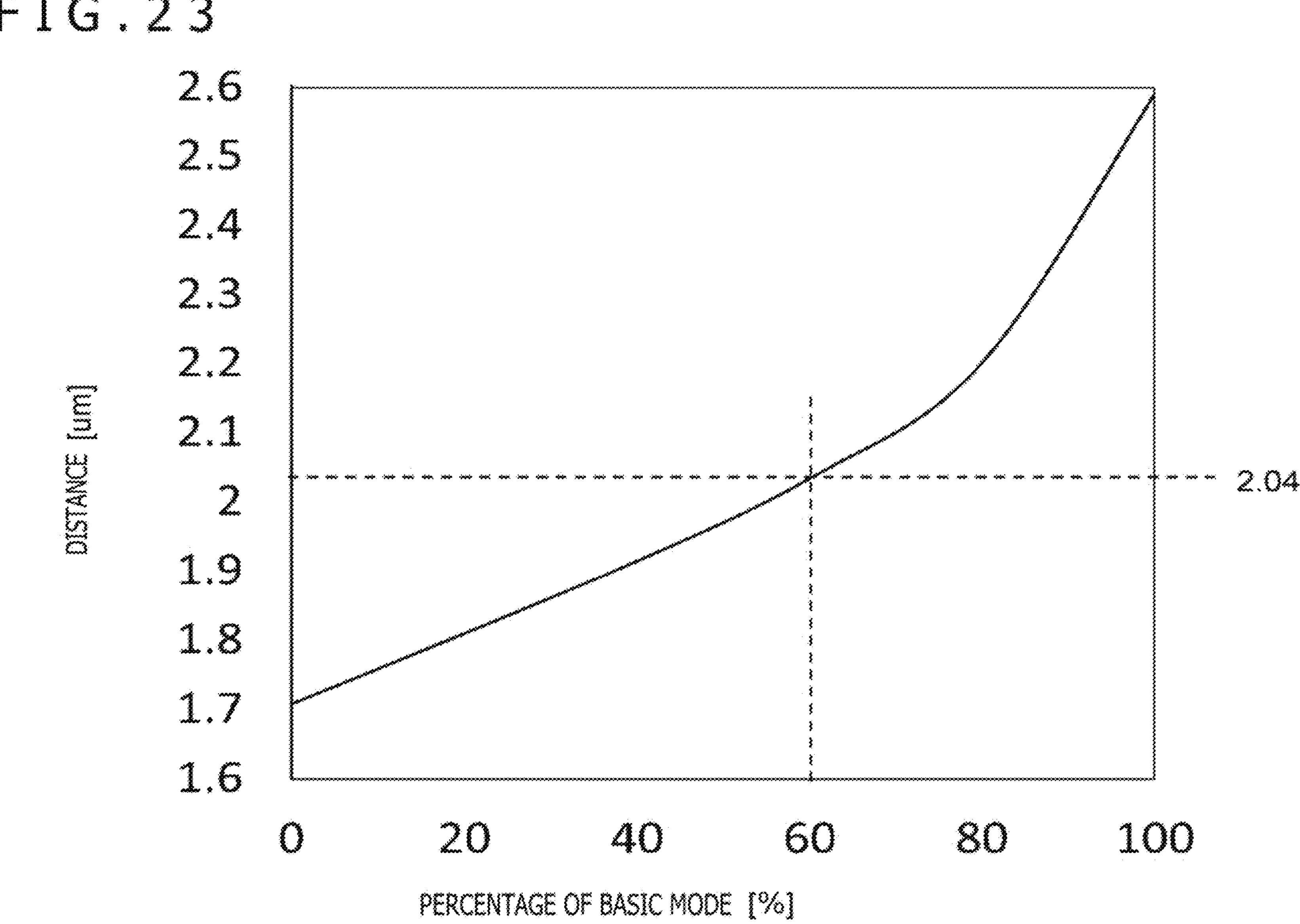
FIG. 23 is a graph indicating a correlation between the ratio of the basic mode and the distance and obtained by plotting distances at which light intensity becomes a predetermined value (0.6) in the graph of the light intensity distributions at the respective mode ratios.

FIG. 23 is a graph that indicates a correlation between the ratio of the basic mode and the distance and that is obtained by plotting the distances at which light intensity becomes a predetermined value, or 0.6 in this example, in the graph of the light intensity distributions at the respective mode ratios in FIG. 22.

The mode ratio can be determined according to the distance in reference to this graph indicating the correlation between the ratio of the basic mode and the distance in FIG. 23, Moreover, for guaranteeing a predetermined value as the ratio of the basic mode, a distance corresponding to the predetermined value may be designated as a threshold to determine pass/fail. For example, for guaranteeing 60% as the ratio of the basic mode, the threshold of the distance is set to 2.04.

Figures 24A, 24B:
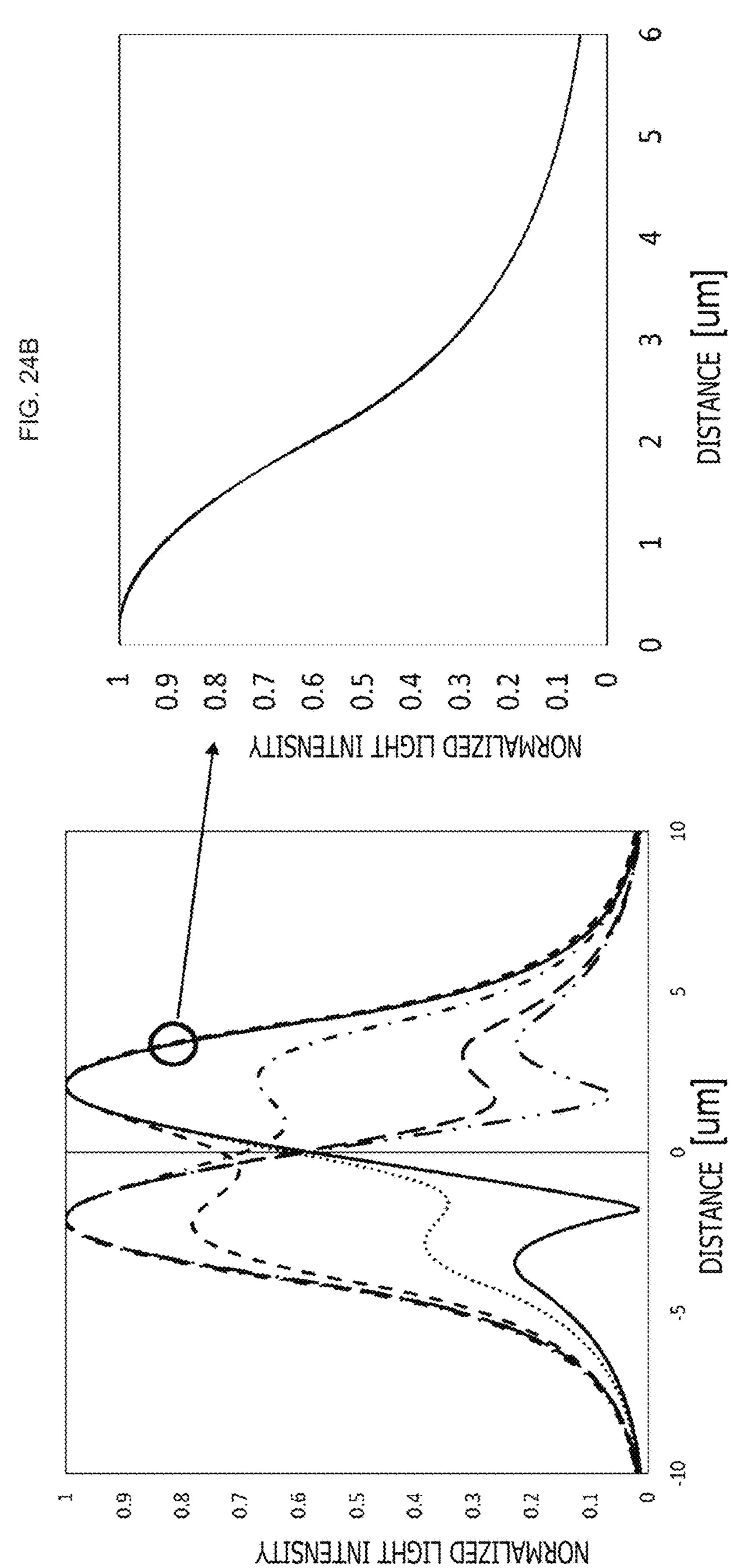
FIGS. 24A and 24B depict diagrams for explaining a complete overlap of curves in light intensity distributions taken at three cross sections on a Y side, each at a portion corresponding to an increase in distances from a distance of a peak value.

An issue to be considered here is whether or not an error is caused by a variation of the light intensity distribution variable depending on the cross-sectional portion as explained with reference to FIGS. 18A and 18B. Similarly to FIG. 18B, FIG. 24A presents a graph of light intensity distributions at the six cross sections q1 to q6 in the transition of the light intensity distribution inside the optical fiber in FIG. 18A. FIG. 24B is a figure illustrating an overlap of curves of the three cross sections on the Y side, each curve being a curve at a portion corresponding to an increase in distances from the distance of the peak value of the light intensity distribution, after the foregoing processes in FIGS. 20 to 22 are performed. As apparent from this figure, the curves of the three cross sections on the Y side, each at the portion corresponding to the increase in distances from the distance of the peak value of the light intensity distribution, completely overlap with each other and agree with each other. While not explained in detail herein, the curves of the three cross sections on the X side, each at a portion corresponding to an increase in distances from the distance of the peak value of the light intensity distribution, completely overlap with each other and agree with each other as in the Y side.

While details are not explained here, the case where the peak value (highest light intensity) is located on the negative side with respect to the center (see X side in FIG. 18B) exhibits a situation similar to the foregoing situation of the case where the peak value (highest light intensity) is located on the positive side with respect to the center as described above (see Y side in FIG. 18B). Specifically, in the case of determining the mode ratio from the light intensity distributions of collimated light, the mode ratio can be determined by determining whether a peak value (highest light intensity) is located on the positive side or the negative side with respect to the center, observing a curve on the side where the peak value is present, and applying the method explained above with reference to FIGS. 20 to 23.

Configuration Example of Optical Communication System

Figure 25:
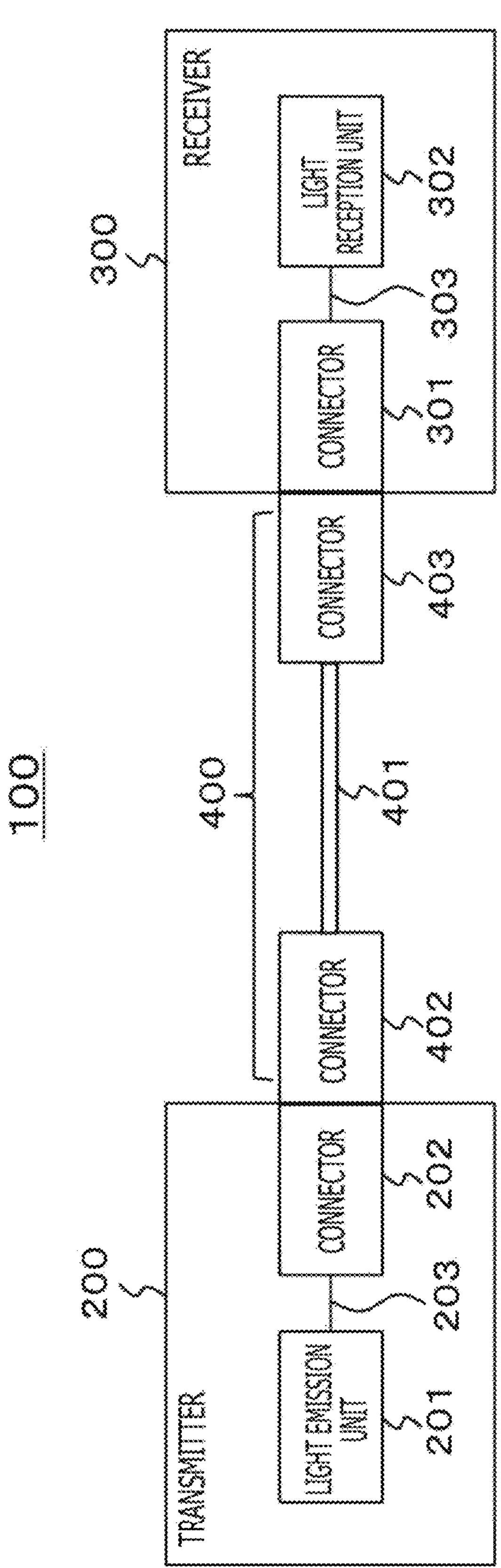
FIG. 25 is a diagram illustrating a configuration example of an optical communication system to which the present technology is applied to guarantee communication quality.

FIG. 25 illustrates a configuration example of an optical communication system 100 to which the present technology is applied to guarantee communication quality. The optical communication system 100 will first be touched upon.

The optical communication system 100 in this example includes a transmitter 200, a receiver 300, and a cable 400. For example, the transmitter 200 is an AV source such as a personal computer (PC), a game machine, a disk player, a set top box, a digital camera, and a cellular phone. For example, the receiver 300 is a TV receiver, a projector, a PC monitor, or the like. The transmitter 200 and the receiver 300 are connected to each other via the cable 400.

The transmitter 200 includes a light emission unit 201, a connector 202 as a receptacle, and an optical fiber 203 for propagating light emitted from the light emission unit 201 to the connector 202. The light emission unit 201 includes a laser element such as a VCSEL, or a light emitting element (light source) such as an LED (light emitting diode). The light emission unit 201 converts an electric signal (transmission signal) generated by an unillustrated transmission circuit into an optical signal. The light (light signal) emitted from the light emission unit 201 is propagated to the connector 202 through the optical fiber 203.

Meanwhile, the receiver 300 includes a connector 301 as a receptacle, a light reception unit 302, and an optical fiber 303 for propagating light received by the connector 301 to the light reception unit 302. The light reception unit 302 includes a light receiving element such as a photodiode. The light reception unit 302 converts an optical signal transmitted from the connector 301 into an electric signal (reception signal), and supplies the electric signal to an unillustrated reception circuit.

The cable 400 includes connectors 402 and 403 provided as plugs at one end and the other end of the optical fiber 401, respectively. The connector 402 at the one end of the optical fiber 401 is connected to the connector 202 of the transmitter 200, while the connector 403 at the other end of the optical fiber 401 is connected to the connector 301 of the receiver 300.

Each of the optical fiber 203 of the transmitter 200, the optical fiber 303 of the receiver 300, and the optical fiber 401 of the cable 400 in the optical communication system 100 is configured to propagate only the basic mode at the first wavelength. Moreover, these optical fibers are each configured such that chromatic dispersion becomes zero at the first wavelength. In this example, the first wavelength is set to 1310 nm, the core diameter d and the numerical aperture NA are 8 μm and 0.1, respectively, which are typical parameters for a 1310 nm optical fiber, and the normalized frequency V is set to 1.92. These optical fibers thus configured each function as a single-mode fiber for the wavelength of 1310 nm (see FIGS. 3A and 3B).

Moreover, the optical communication system 100 communicates using light having the second wavelength. The second wavelength here is a wavelength at which each of the optical fibers described above can propagate at least the primary mode along with the basic mode. The light emitted from the light emission unit 201 has this second wavelength. It is assumed here that the second wavelength is 850 nm. In a case where light having 850 nm is used, the normalized frequency V of these optical fibers becomes 2.96. Accordingly, the respective optical fibers can also propagate the primary mode along with the basic mode, and can thus function as double-mode fibers (see FIGS. 6A and 6B).

Light that has 850 nm and is emitted from the light emission unit 201 is introduced into the optical fiber 203 which is a 1310 nm single-mode fiber, and is propagated to the connector 202. In this case, the primary mode produced by optical axis misalignment is propagated together with the basic mode when the light introduced into the optical fiber 203 includes optical axis misalignment. As a result, a coupling loss of optical power decreases (see FIG. 8). Accordingly, cost reduction is achievable by lowering accuracy associated with optical axis misalignment.

Moreover, at the connection portion between the connector 202 of the transmitter 200 and the connector 402 of the cable 400, light that has 850 nm and is emitted from the connector 202 is introduced into the optical fiber 401 which is a 1310 nm single-mode fiber, and is propagated toward the receiver 300. In this case, the primary mode produced by optical axis misalignment is propagated together with the basic mode when the light introduced into the optical fiber 401 includes optical axis misalignment. As a result, a coupling loss of optical power decreases (see FIG. 8). Accordingly, cost reduction is achievable by lowering accuracy associated with optical axis misalignment.

Further, at the connection portion between the connector 403 of the cable 400 and the connector 301 of the receiver 300, light in the band of 850 nm emitted from the connector 403 is introduced into the optical fiber 303 which is a 1310 nm single-mode fiber, and is propagated to the light reception unit 302. In this case, the primary mode produced by optical axis misalignment is propagated together with the basic mode when the light introduced into the optical fiber 303 includes optical axis misalignment. As a result, a coupling loss of optical power decreases (see FIG. 8). Accordingly, cost reduction is achievable by lowering accuracy associated with optical axis misalignment.

For example, the present technology is applicable to the optical communication system 100 described above, for determining whether a light diameter of collimated light emitted from the connector (receptacle) 202 of the transmitter 200 and joined to the connector (plug) of the cable 400, or of collimated light emitted from the connector (plug) 403 of the cable 400 and joined to the connector (receptacle) 301 of the receiver 300 falls within a specified range.

Figure 26:
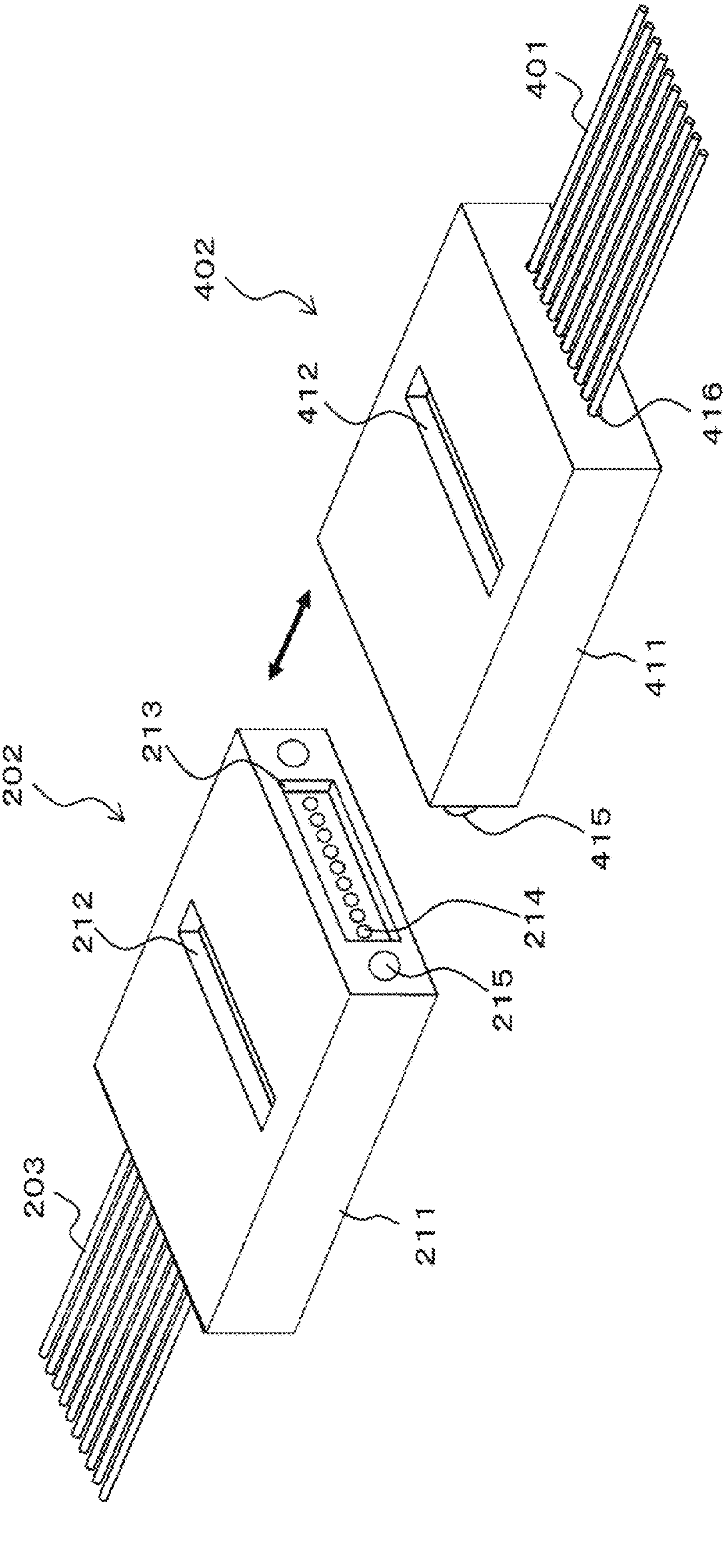
FIG. 26 is a perspective diagram illustrating a configuration example of a connector of a transmitter and a connector of a cable.
Figure 27:
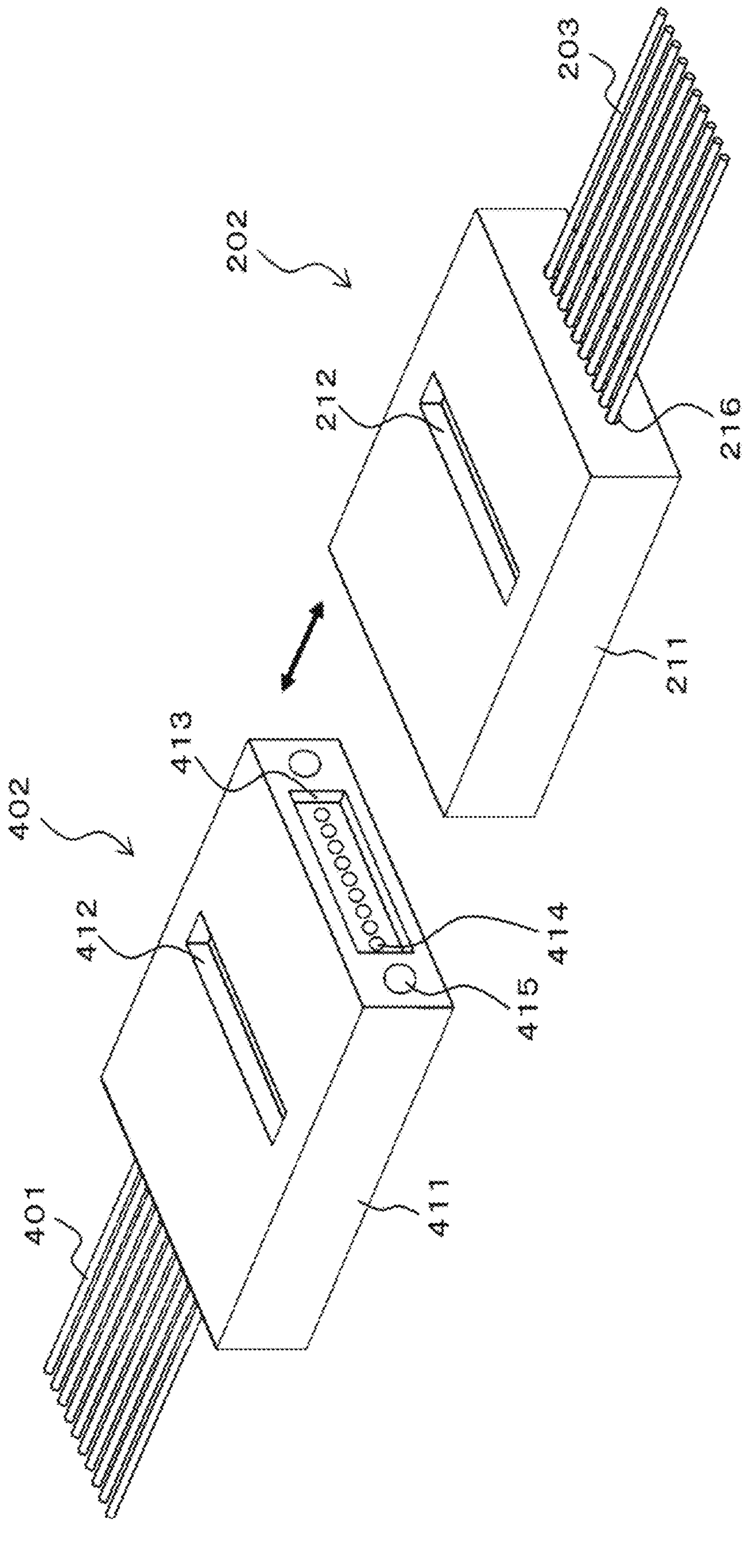
FIG. 27 is a perspective diagram illustrating the configuration example of the connector of the transmitter and the connector of the cable.

FIG. 26 is a perspective diagram illustrating a configuration example of the connector 202 of the transmitter 200 and the connector 402 of the cable 400 in FIG. 25. FIG. 27 is also a perspective diagram illustrating a configuration example of the connector 202 of the transmitter 200 and the connector 402 of the cable 400, but is a diagram viewed in a direction opposite to the viewing direction in FIG. 26. The example illustrated in the figures is compatible with parallel transfer of optical signals in multiple channels. As noted, the configuration in this example is compatible with parallel transfer of optical signals in multiple channels. However, while not described in detail, a configuration compatible with transfer of optical signals in one channel may similarly be formed. In the case of the multiple channels, multiple sets of the combination of the transmission unit and the reception unit are provided.

The connector 202 includes a connector main body (ferrule) 211 having a substantially cuboid external appearance. Multiple optical fibers 203 corresponding to respective channels are arranged in the horizontal direction, and connected to the back side of the connector main body 211. A distal end of each of the optical fibers 203 is inserted into an optical fiber insertion hole 216 and fixed thereto.

Moreover, an adhesive injection hole 212 having a rectangular opening is formed on the upper surface side of the connector main body 211. An adhesive is injected through the adhesive injection hole 212 to fix the optical fibers 203 to the connector main body 211.

Further, a light emission portion (light transmission space) 213 that is recessed and has a rectangular opening is provided on the front side of the connector main body 211. Multiple lenses (collimating lenses) 214 corresponding to respective channels are arranged in the horizontal direction and formed in a bottom portion of the light emission portion 213. This configuration prevents damage of surfaces of the lenses 214 that could be caused by accidental contact with the opposite connector or the like.

In addition, position regulation portions 215 each having a protruded or recessed shape, or a recessed shape in the example of the figure, are formed integrally with the front surface side of the connector main body 211 for alignment with the connector 402. This configuration facilitates optical axis alignment at the time of connection with the connector 402.

The connector 402 includes a connector main body (ferrule) 411 having a substantially cuboid external appearance. Multiple optical fibers 401 corresponding to respective channels are arranged in the horizontal direction, and connected to the back side of the connector main body 411. A distal end of each of the optical fibers 401 is inserted into an optical fiber insertion hole 416 and fixed thereto.

Moreover, an adhesive injection hole 412 having a rectangular opening is formed on the upper surface side of the connector main body 411. An adhesive is injected through the adhesive injection hole 412 to fix the optical fibers 401 to the connector main body 411.

Further, a light introduction portion (light transmission space) 413 that is recessed and has a rectangular opening is provided on the front side of the connector main body 411. Multiple lenses (collection lenses) 414 corresponding to respective channels are arranged in the horizontal direction and formed in a bottom portion of the light introduction portion 413. This configuration prevents damage of surfaces of the lenses 414 that could be caused by accidental contact with the opposite connector or the like.

In addition, position regulation portions 415 each having a recessed or protruded shape, or a protruded shape in the example of the figure, are formed integrally with the front surface side of the connector main body 411 for alignment with the connector 202. This configuration facilitates optical axis alignment at the time of connection with the connector 202. Note that each of the position regulation portions 415 and the regulation portions 215 is not limited to a portion formed integrally with the connector main body 411 or the connector main body 211, and may be constituted by a pin, or provided by other methods.

Figure 28A:
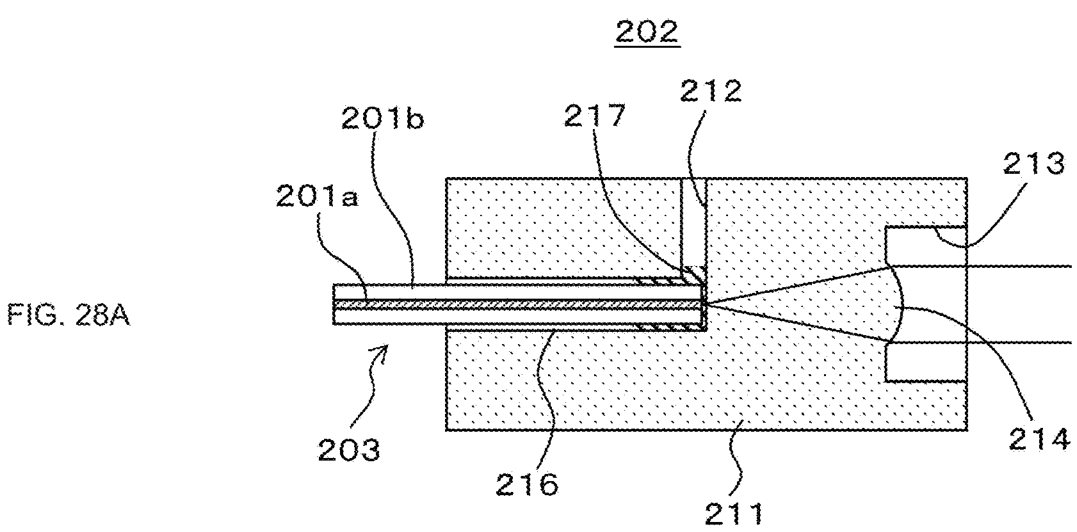
FIGS. 28A and 28B depict cross-sectional diagrams illustrating an example of the connector of the transmitter and the connector of the cable.

FIG. 28A is a cross-sectional diagram illustrating an example of the connector 202 of the transmitter 200. The position regulation portions 215 (see FIG. 26) are not indicated in the example of the figure. The connector 202 will be further explained with reference to FIG. 28A.

The connector 202 includes the connector main body 211. For example, the connector main body 211 includes a light transmissive material such as synthetic resin and glass, or a material transmitting a specific wavelength such as silicon, and has a configuration of a ferrule equipped with a lens.

This lens-equipped ferrule configuration of the connector main body 211 facilitates optical axis alignment between the optical fiber and the lens. Moreover, this lens-equipped ferrule configuration of the connector main body 211 easily achieves multi-channel communication only by insertion of the optical fibers into the ferrule even in a case of multi-channels.

The light emission portion (light transmission space) 213 having a recessed shape is formed on the front side of the connector main body 211. In addition, multiple lenses (convex lenses) 214 corresponding to respective channels are arranged in the horizontal direction and formed integrally with the connector main body 211 configured as above at positions of a bottom portion of the light emission portion 213.

Further, multiple optical fiber insertion holes 216 extending from the back side to the front side are formed in the connector main body 211, and arranged in the horizontal direction in alignment with the lenses 214 of the respective channels. Each of the optical fibers 203 constitutes a double structure which has a core 203*a* corresponding to a central portion and forming an optical path, and a clad 203*b* covering surroundings of the core 203*a*.

Each of the optical fiber insertion holes 216 of the respective channels is formed in alignment with the optical axis of the lens 214 corresponding to the core 203*a* of the optical fiber 203 inserted into the corresponding optical fiber insertion hole 216, Moreover, each of the optical fiber insertion holes 216 of the respective channels is formed such that a bottom position of the optical fiber insertion hole 216, i.e., a position in contact with a distal end (introduction end) of the optical fiber 203 at the time of insertion of the optical fiber 203, is aligned with a focal position of the lens 214.

Further, the adhesive injection hole 212 extending downward from the upper surface is formed in the connector main body 211 in such a manner as to communicate with a portion around the bottom positions of multiple optical fiber insertion holes 216 arranged in the horizontal direction. After insertion of the optical fibers 203 into the optical fiber insertion holes 216, an adhesive 217 is injected through the adhesive injection hole 212 toward an area around the optical fibers 203 to fix the optical fibers 203 to the connector main body 211.

Each of the lenses 214 of the connector 202 has a function of forming light emitted from the optical fiber 203 into collimated light and releasing the collimated light. In such a manner, light released from emission ends of the optical fibers 203 at a predetermined NA is introduced into the lenses 214, formed into collimated light, and released therefrom.

Figure 28B:
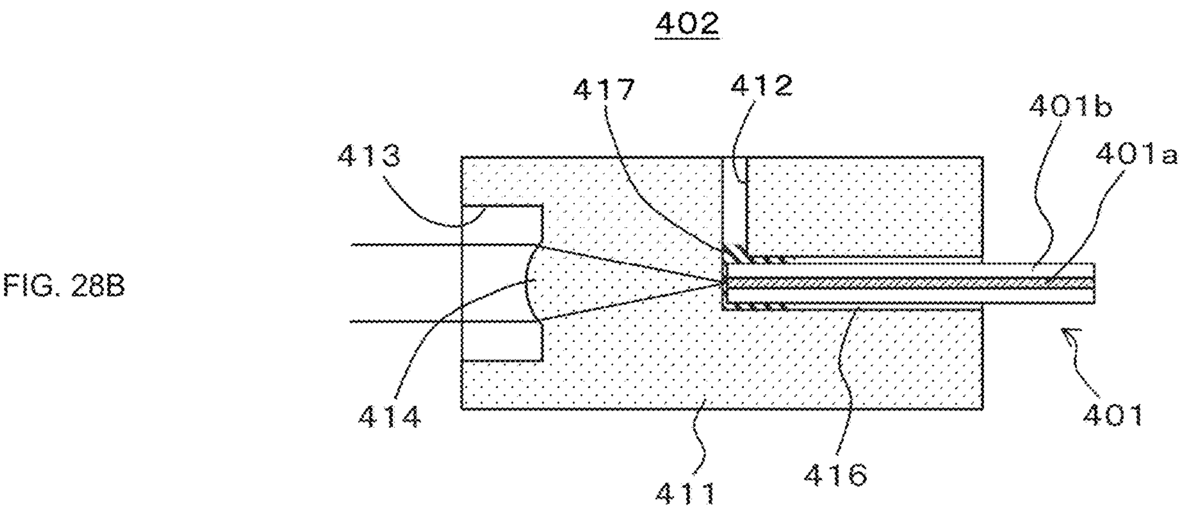

FIG. 28B is a cross-sectional diagram illustrating an example of the connector 402 of the cable 400. The position regulation portions 415 (see FIGS. 26 and 27) are not indicated in the example of the figure. The connector 402 will be further explained with reference to FIG. 28B.

The connector 402 includes the connector main body 411. For example, the connector main body 411 includes a light transmissive material such as synthetic resin and glass, or a material transmitting a specific wavelength such as silicon, and has a configuration of a ferrule equipped with a lens.

The light introduction portion (light transmission space) 413 having a recessed shape is formed on the front side of the connector main body 411. In addition, multiple lenses (convex lenses) 414 corresponding to respective channels are arranged in the horizontal direction and formed integrally with the connector main body 411 configured as above, at positions of a bottom portion of the light introduction portion 413.

Further, multiple optical fiber insertion holes 416 extending from the back side to the front side are formed in the connector main body 411, and arranged in the horizontal direction in alignment with the lenses 414 of the respective channels. Each of the optical fibers 401 constitutes a double structure which has a core 401*a* corresponding to a central portion and forming an optical path and a clad 401*b* covering surroundings of the core 401*a*.

Each of the optical fiber insertion holes 416 of the respective channels is formed in alignment with the optical axis of the lens 414 corresponding to the core 401*a* of the optical fiber 401 inserted into the corresponding optical fiber insertion hole 416. Moreover, each of the optical fiber insertion holes 416 of the respective channels is formed such that a bottom position of the optical fiber insertion hole 416, i.e., a position in contact with a distal end (introduction end) of the optical fiber 401 at the time of insertion of the optical fiber 401, is aligned with a focal position of the lens 414.

Further, the adhesive injection hole 412 extending downward from the upper surface is formed in the connector main body 411 in such a manner as to communicate with a portion around the bottom positions of multiple optical fiber insertion holes 416 arranged in the horizontal direction. After insertion of the optical fibers 401 into the optical fiber insertion holes 416, an adhesive 417 is injected through the adhesive injection hole 412 toward an area around the optical fibers 401 to fix the optical fibers 401 to the connector main body 411.

Each of the lenses 414 of the connector 402 included in the cable 400 has a function of collecting introduced collimated light. In this case, the collimated light is introduced into the lenses 414 and collected. This collected light is introduced into the introduction ends of the optical fibers 401 at a predetermined NA.

Figure 29:
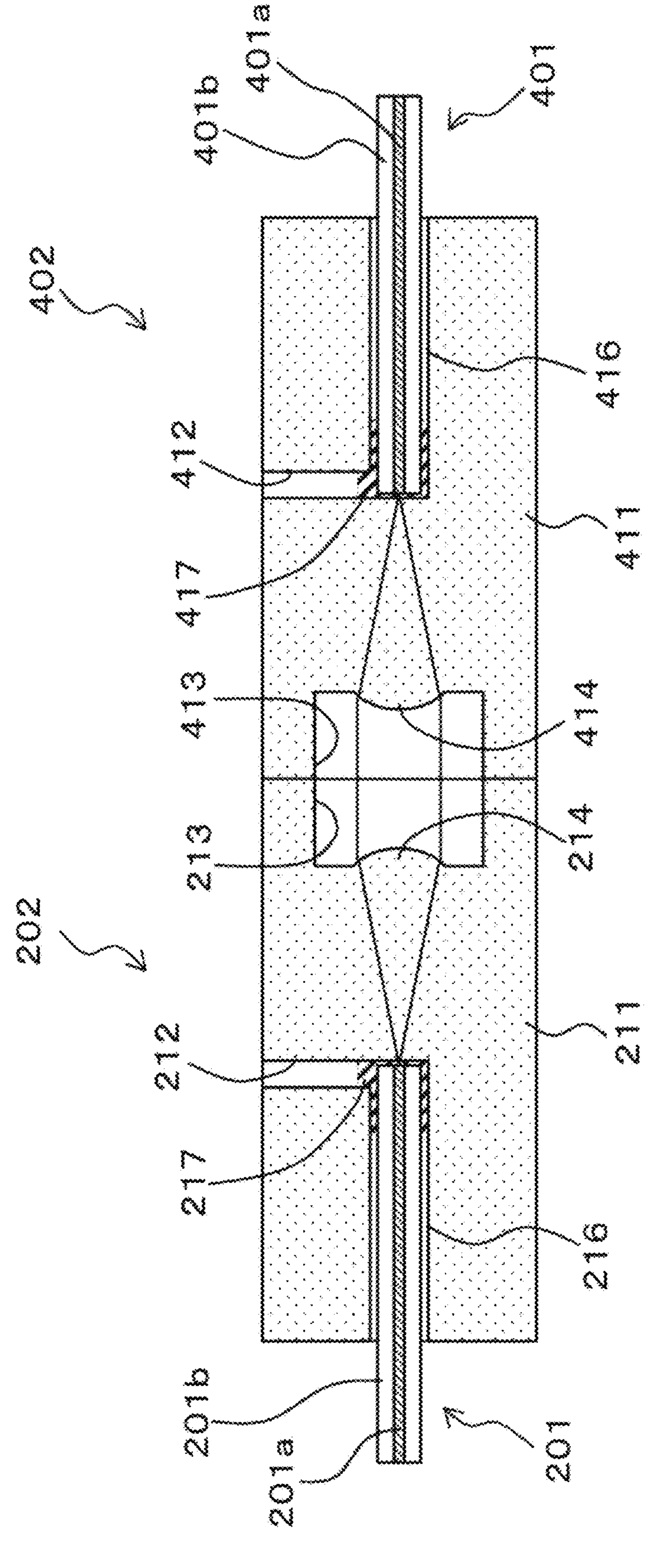
FIG. 29 is a cross-sectional diagram illustrating a connected state of the connector of the transmitter and the connector of the cable.

FIG. 29 is a cross-sectional diagram illustrating a connected state of the connector 202 of the transmitter 200 and the connector 402 of the cable 400. In the connector 202, light transmitted through the optical fiber 203 is released from the emission end of the optical fiber 203 at a predetermined NA. The released light is introduced into the lens 214, formed into collimated light, and emitted toward the connector 402.

Meanwhile, in the connector 402, the light emitted from the connector 202 is introduced into the lens 414 and collected. Thereafter, the collected light is introduced into the introduction end of the optical fiber 401, and transmitted through the optical fiber 401.

While not explained in detail, the connector 403 of the cable 400 and the connector 301 of the receiver 300 in the optical communication system 100 in FIG. 25 are configured in a manner similar to that in the configuration example of the connector 202 of the transmitter 200 and the connector 402 of the cable 400 in the optical communication system 100 in FIG. 25 described above.

Configuration Example of Determination System

Figure 30:
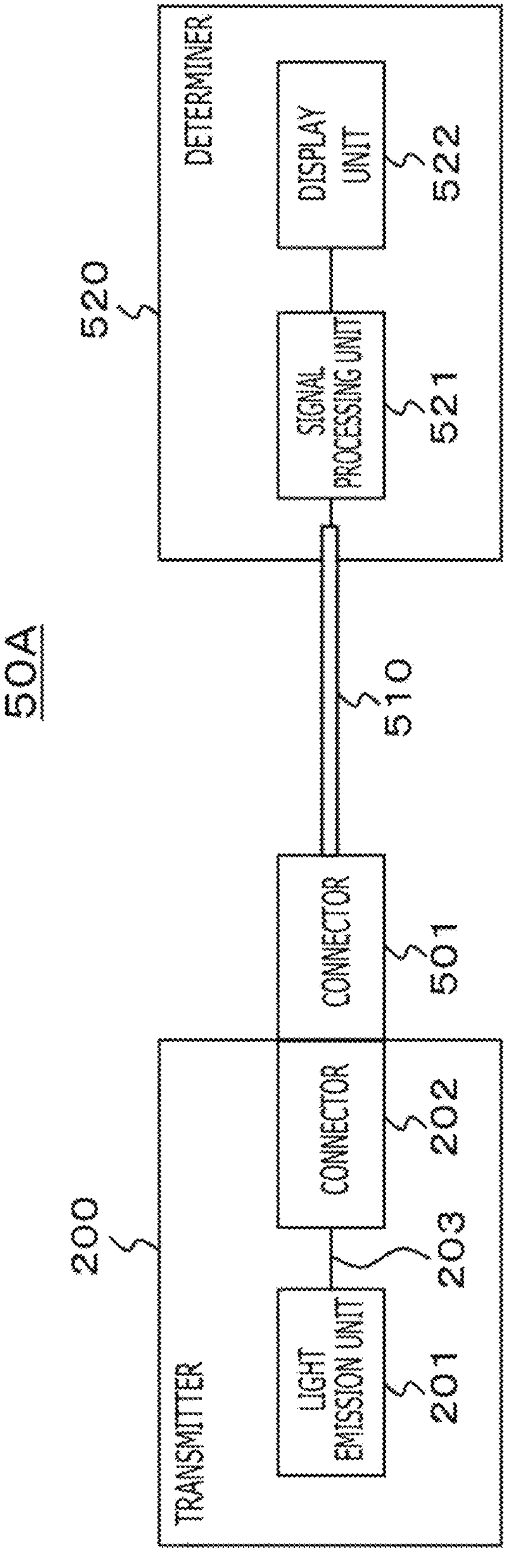
FIG. 30 is a diagram illustrating a configuration example of a determination system which determines a mode ratio in collimated light emitted from the connector of the transmitter as a determination target.

FIG. 30 illustrates a configuration example of a determination system 50A which determines a light diameter of collimated light emitted from the connector 202 of the transmitter 200 as a determination target. The determination system 50A here includes the transmitter 200, a cable 510, and a determiner 520. The transmitter 200 and the determiner 520 are connected to each other via the cable 510.

The cable 510 includes a connector 501 as a plug on the transmitter 200 side. The connector 501 connected to the connector (receptacle) 202 of the transmitter 200 monitors light intensity distributions of collimated light emitted from the connector 202, and sends monitoring information to the determiner 520 through the cable 510. In this case, the connector 501 constitutes a light intensity distribution acquisition unit for acquiring light intensity distributions of collimated light.

Figure 31:
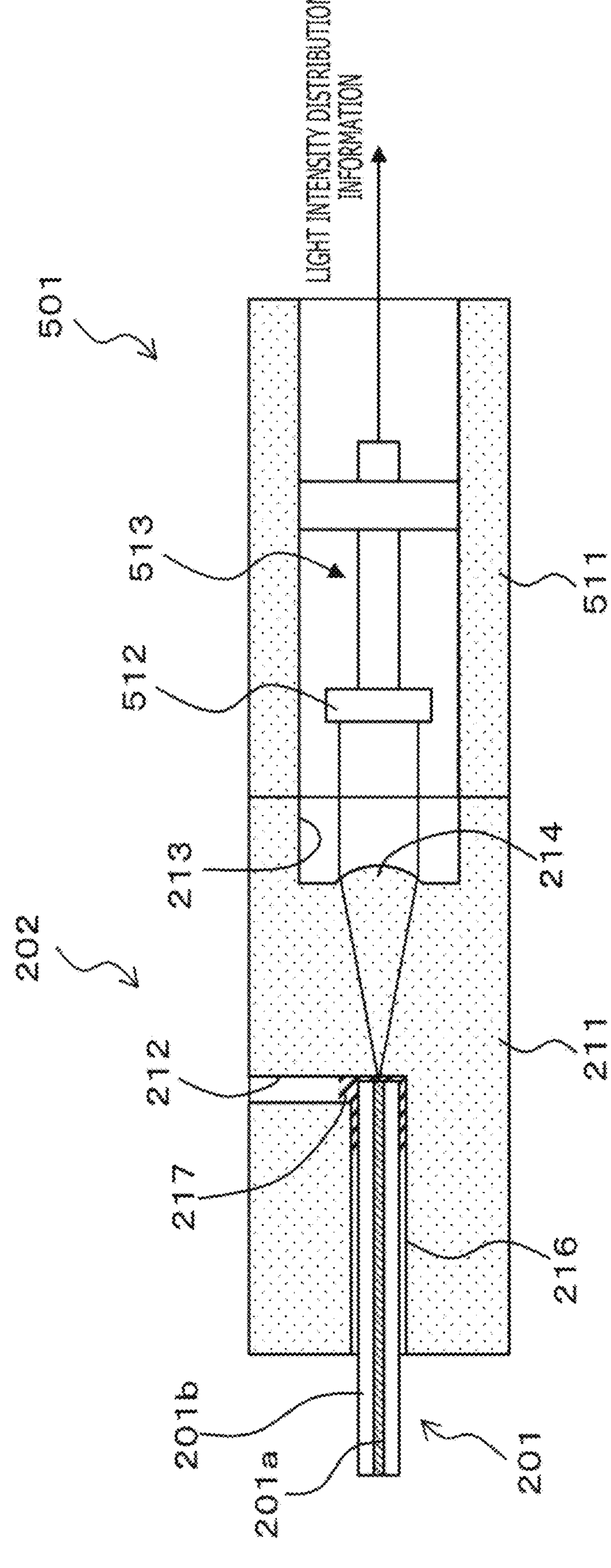
FIG. 31 is a diagram illustrating a connected state of the connector of the transmitter and a connector of a cable connected to a determiner.

FIG. 31 illustrates a connected state of the connector 202 of the transmitter 200 and the connector 501 of the cable 510 connected to the determiner 520. The connector 202 is similar to the connector 202 described above with reference to FIG. 28A, and hence is not touched upon here.

The connector 501 will be explained. Similarly to the above-described alignment at the time of connection between the connector 202 and the connector 402, alignment at the time of connection between the connector 501 and the connector 202 is achieved using position regulation portions formed in both the connector 501 and the connector 202 (see position regulation portions 215 and 415 in FIG. 26).

The connector 501 has a connector main body 511. A light intensity distribution monitoring element 512 is disposed inside the connector main body 511. The light intensity distribution monitoring element 512 is positionally adjustable by a position movable jig 513. The light intensity monitoring element 512 is an element for monitoring light intensity distributions of collimated light emitted from the connector 202, and includes a CCD (Charge-Coupled Device) image sensor, a CMOS (Complementary Metal Oxide Semiconductor) image sensor, an infrared image sensor specialized for long wavelengths, or the like, for example.

The light intensity distribution monitoring element 512 is disposed in such a position that a monitoring surface (imaging surface) of the light intensity distribution monitoring element 512 crosses the optical axis of the collimated light emitted from the connector 202 at right angles. The light intensity distribution monitoring element 512 introduces the collimated light emitted from the connector 202 into this monitoring surface, and outputs information associated with the light intensity distributions of the collimated light, such as imaging signals.

As described above, in a case where the connector 202 is compatible with parallel transfer of optical signals of multiple channels, the connector 501 is also compatible with parallel transfer. In this case, multiple light intensity distribution monitoring elements 512 are arranged in correspondence with the respective channels, for example. Note that, in this case, only one light intensity distribution monitoring element may be provided in this situation to constitute the light intensity distribution monitoring element 512. In such a case, the one light intensity distribution monitoring element 512 may correspond to all of the multiple channels, or to some of the channels, such as one channel. In the case where the light intensity distribution monitoring element 512 corresponds to some of the channels, the light intensity distribution monitoring element 512 sequentially shifts to determine the mode ratio in collimated light for each of the channels.

The position movable jig 513 is configured to adjust positions of X and Y axes in an X-Y plane of the light intensity distribution monitoring element 512 as a plane perpendicular to the optical axis of the collimated light, and also adjust a position of a Z axis direction of the light intensity distribution monitoring element 512, which is a direction of the optical axis of the collimated light.

Figure 32:
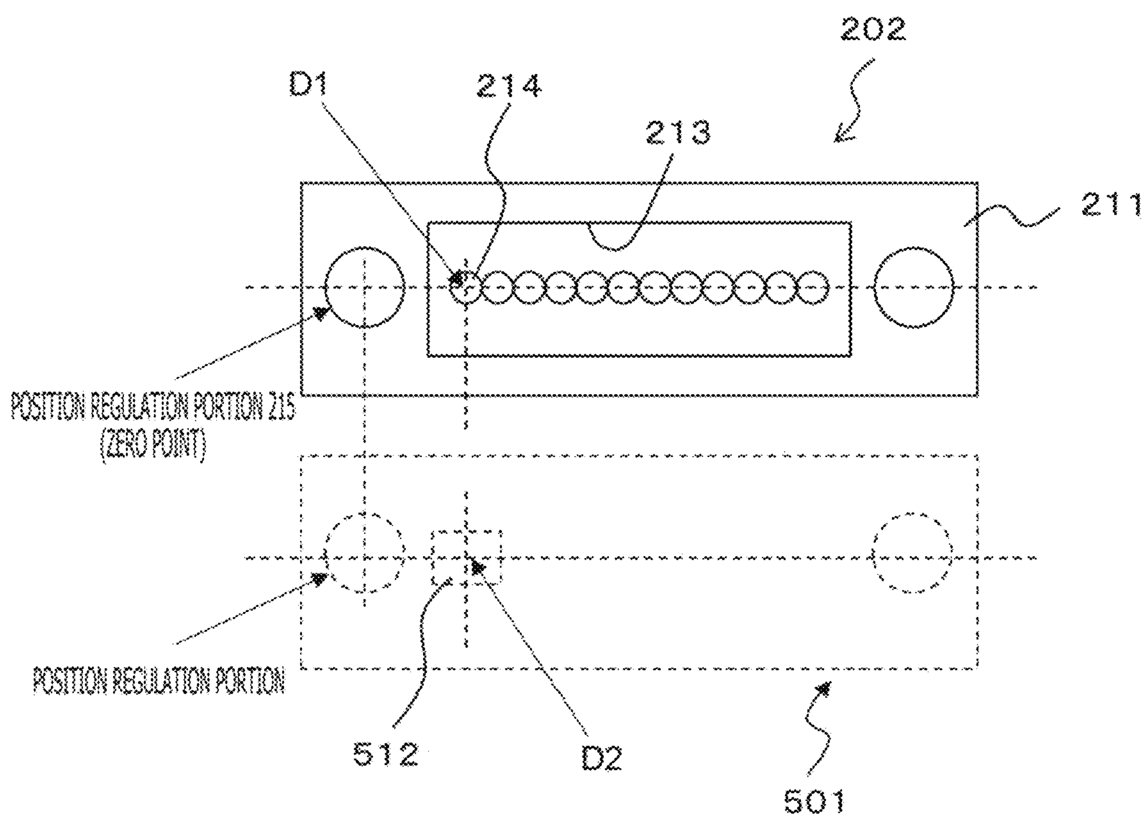
FIG. 32 is a diagram for explaining an example for determining an optical axis center of collimated light.

Note that absolute position information associated with collimated light emitted from the connector 202 of the transmitter 200 needs to be acquired to determine the optical axis center of the collimated light. In this case, the position regulation portion 215 is designated as a zero-point, and a center position D1 of the lens 214 determined by this zero-point, i.e., the center position of the collimated light, is defined as the optical axis center as illustrated in FIG. 32.

In this case, a center position D2 of the light intensity distribution monitoring element 512 is not necessarily required to be aligned with the center position D1 of the lens 214. When the center position D2 of the light intensity distribution monitoring element 512 and the center position D1 of the lens 214 with respect to the zero-point located at the position regulation portion 215 are known, the center position of the lens 214 on the monitoring surface of the light intensity distribution monitoring element 512, and hence the center position of the collimated light, can be calculated in reference to these known positions.

Moreover, as described above with reference to FIG. 13, the shape of the light intensity distribution of the collimated light is variable according to the position on the Z axis. Accordingly, it is preferable that light intensity distribution information be acquired from collimated light immediately after emission from the lens (collimating lens) 214, and determine the mode ratio in reference to this information.

Described with reference to FIG. 30 again, the determiner 520 includes a signal processing unit 521 and a display unit 522. The signal processing unit 521 determines a mode ratio in collimated light emitted from the connector 202 of the transmitter 200 in reference to light intensity distribution information associated with collimated light transmitted from the connector 501 through the cable 510, such as imaging signals. The signal processing unit 521 here constitutes a determination processing unit.

For example, the signal processing unit 521 determines whether the ratio of the basic mode contained in the collimated light is a threshold or higher, such as 60% or higher. Moreover, for example, the signal processing unit 521 determines the ratio of the basic mode contained in the collimated light.

Figure 33:
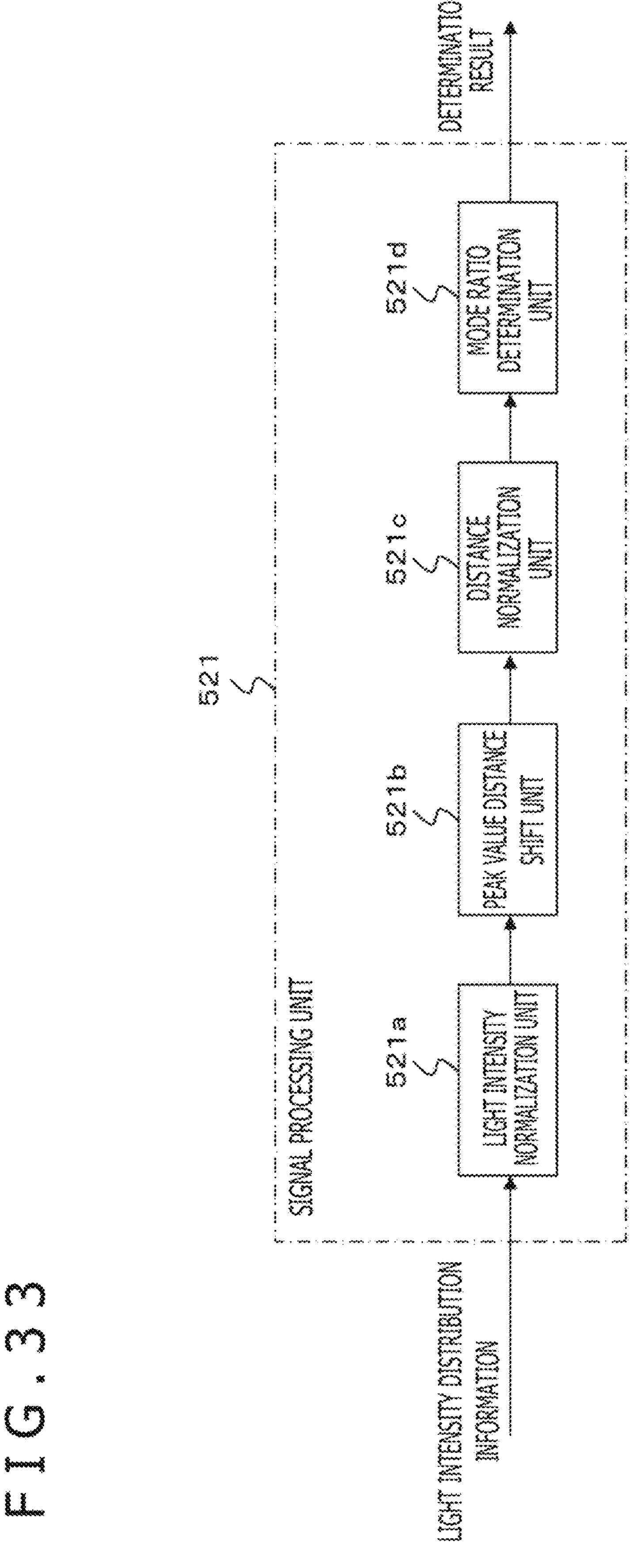
FIG. 33 is a diagram illustrating an example of function blocks of a signal processing unit.

FIG. 33 illustrates an example of function blocks of the signal processing unit 521. The signal processing unit 521 includes a light intensity normalization unit 521*a*, a peak value distance shift unit 521*b*, a distance normalization unit 521*c*, and a mode ratio determination unit 521*d*.

The light intensity normalization unit 521*a* performs a process for normalizing a light intensity distribution specified in reference to the light intensity distribution information transmitted from the connector 501 through the cable 510, such as an imaging signal, such that a peak value of the light intensity distribution becomes a predetermined value, such as 1 (see FIG. 20).

For the light intensity distribution obtained by the light intensity normalization unit 521*a* and normalized such that the peak value becomes the predetermined value, the peak value distance shift unit 521*b* performs a process for shifting this light intensity distribution such that the distance of the peak value becomes a predetermined distance, such as 0 (see FIG. 20). The light intensity distribution shifted such that the distance of the peak value becomes the predetermined distance constitutes a first determination light intensity distribution.

For the light intensity distribution obtained by the peak value distance shift unit 521*b* and shifted such that the distance of the peak value becomes the predetermined distance, the distance normalization unit 521*c* performs a process for normalizing this light intensity distribution such that the distance corresponding to light intensity of a predetermined value, such as 1/e^2 of the peak value, becomes a predetermined distance, such as 4.4 (see FIG. 22). The light intensity distribution normalized such that the distance corresponding to light intensity of the predetermined value becomes the predetermined distance as described above constitutes a second determination light intensity distribution.

The mode ratio determination unit 521*d* determines a mode ratio in reference to a distance at which light intensity in a curve of the light intensity distribution becomes a predetermined value, such as 0.6 (this distance is an absolute value also considering such a case where the peak value in the original light intensity distribution is present on the negative side). This curve is a curve of the light intensity distribution normalized by the distance normalization unit 521*c* such that the distance corresponding to light intensity of the predetermined value becomes the predetermined distance (light intensity distribution information transmitted from the connector 501 through the cable 510, such as a curve indicating a curve at a portion corresponding to an increase in distances from the distance of the peak value of light intensity on the side where the peak value is located in the light intensity distribution specified in reference to an imaging signal).

In a case of determining whether the ratio of the basic mode contained in collimated light is a threshold or higher here, the mode ratio determination unit 521*d* compares the distance corresponding to light intensity of the predetermined value with the distance corresponding to the threshold of the ratio of the basic mode. In a case where the distance corresponding to light intensity of the predetermined value is the distance corresponding to the threshold of the ratio of the basic mode or longer, it is determined that the ratio of the basic mode is the threshold or higher. For example, in a case of determining whether the ratio of the basic mode is 60% or higher at the distance corresponding to light intensity of 0.6, the mode ratio determination unit 521*d* determines that the ratio of the basic mode is 60% or higher in a case where the distance corresponding to the light intensity of 0.6 is 2.04 or longer (see FIG. 23).

Moreover, in a case of determining the ratio of the basic mode contained in the collimated light, the mode ratio determination unit 521*d* determines the ratio of the basic mode contained in the collimated light from the distance corresponding to light intensity of the predetermined value with reference to a graph indicating a correlation between the ratio of the basic mode and the distance. For example, in a case of the distance corresponding to light intensity of 0.6, the mode ratio determination unit 521*d* determines the ratio of the basic mode contained in the collimated light from the distance corresponding to light intensity of 0.6 with reference to the graph indicating the correlation between the ratio of the basic mode and the distance (see FIG. 23).

Described with reference to FIG. 30 again, the display unit 522 includes an LCD panel, an organic EL panel, or the like, and displays a determination result output from the signal processing unit 521 in reference to this determination result. While presented here is an example of a notification to a user by display of the determination result, also adoptable is a notification using voices, buzzer sounds, or the like together with the display or instead of the display.

Figure 34:
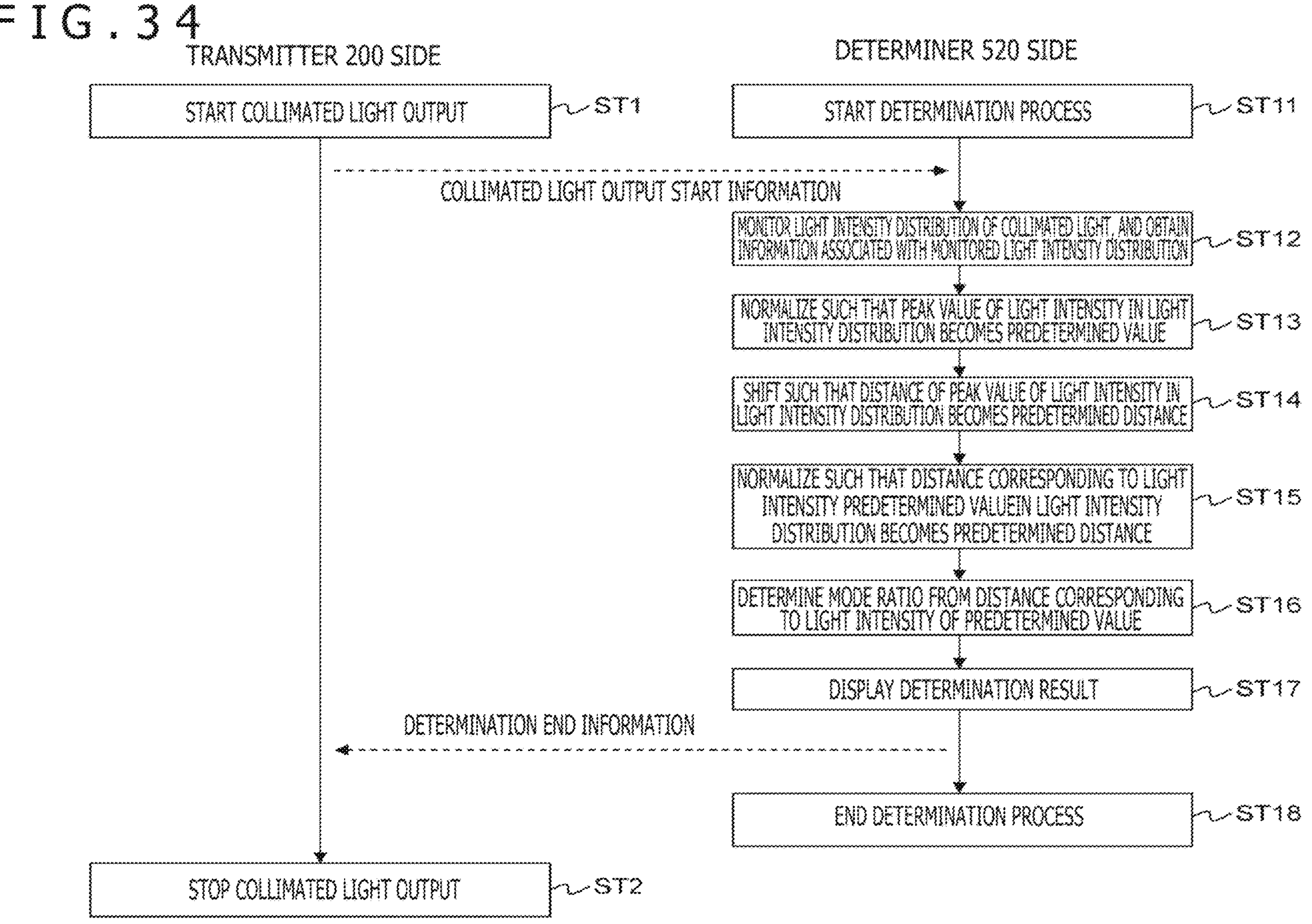
FIG. 34 is a flowchart illustrating an example of processing procedures performed by the transmitter and the determiner at the time of determination made by the determiner.

A flowchart in FIG. 34 illustrates an example of processing procedures performed by the transmitter 200 and the determiner 520 at the time of determination made by the determiner 520.

In step ST1, the transmitter 200 starts output of collimated light. Meanwhile, the determiner 520 starts a determination process in step ST11.

In subsequent step ST12, the determiner 520 monitors light intensity distributions of the collimated light by using the light intensity distribution monitoring element 512 of the connector 501, to obtain information associated with these light intensity distributions. For example, the determiner 520 captures an image of the collimated light to obtain imaging signals as the light intensity distribution information of the collimated light.

In subsequent step ST13, the determiner 520 normalizes a light intensity distribution specified in reference to the light intensity distribution information obtained in step ST12, such that a peak value of the distribution becomes a predetermined value, such as 1 (see FIG. 20).

In subsequent step ST14, for the light intensity distribution obtained in step ST13 and normalized such that the peak value becomes the predetermined value, the determiner 520 shifts this light intensity distribution such that the distance of the peak value becomes a predetermined distance, such as 0 (see FIG. 21).

In subsequent step ST15, for the light intensity distribution obtained in step ST14 and shifted such that the distance of the peak value becomes the predetermined distance, the determiner 520 normalizes this light intensity distribution such that the distance corresponding to light intensity of a predetermined value, such as a value of 1/e^2 of the peak value, becomes a predetermined distance, such as 4.4 (see FIG. 22).

In subsequent step ST16, the determiner 520 determines a mode ratio in reference to a distance at which light intensity in a curve of the light intensity distribution becomes a predetermined value, such as 0.6 (this distance is an absolute value also considering such a case where the peak value in the original light intensity distribution is located on the negative side). This curve is a curve of the light intensity distribution normalized in step ST15 such that the distance corresponding to light intensity of the predetermined value becomes the predetermined distance (this curve is a curve indicating a curve at a portion corresponding to an increase in distances from the distance of the peak value of light intensity on the side where the peak value is located in the light intensity distribution specified in reference to the light intensity distribution information obtained in step ST12).

In a case of determining whether the ratio of the basic mode contained in the collimated light is the threshold or higher here, the distance corresponding to light intensity of the predetermined value is compared with the distance corresponding to the threshold of the ratio of the basic mode. In a case where the distance corresponding to light intensity of the predetermined value is the distance corresponding to the threshold of the ratio of the basic mode or longer, it is determined that the ratio of the basic mode is the threshold or higher. For example, in a case of determining whether the ratio of the basic mode is 60% or higher at the distance corresponding to light intensity of 0.6, the ratio of the basic mode is determined to be 60% or higher in a case where the distance corresponding to the light intensity of 0.6 is 2.04 or longer (see FIG. 23).

Moreover, in a case of determining the ratio of the basic mode contained in the collimated light here, the ratio of the basic mode contained in the collimated light is determined in reference to the distance corresponding to light intensity of the predetermined value with reference to a graph indicating a correlation between the ratio of the basic mode and the distance. For example, in a case of the distance corresponding to light intensity of 0.6, the ratio of the basic mode contained in the collimated light is determined from the distance corresponding to light intensity of 0.6 with reference to the graph indicating the correlation between the ratio of the basic mode and the distance (see FIG. 23).

In subsequent step ST17, the determiner 520 displays a determination result obtained in step ST15 by using the display unit 522, in reference to this determination result, to notify the user of the determination result.

In subsequent step ST18, the determiner 520 ends the determination process, while the transmitter 200 stops output of collimated light in step ST2.

Note that the determination process may be started by the determiner 520 in step ST12 in reference to collimated light output start information given from the transmitter 200 to the determiner 520, and that the output of the collimated light from the transmitter 200 in step ST2 may be ended in reference to determination end information given from the determiner 520 to the transmitter 200. Alternatively, this start and end may be made based on manual operation by the user.

As described above, the determination system 50A illustrated in FIG. 30 determines a mode ratio in reference to light intensity distribution information associated with collimated light that is emitted from the connector 202 of the transmitter 200 and that contains a basic mode component and a primary mode component, such as a slope of a curve at a portion corresponding to an increase in distances from a distance of a peak value of light intensity on the side where the peak value is present with respect to the center positioned at the optical axis of the collimated light in a light intensity distribution acquired in reference to an imaging signal. Accordingly, the determination system 50A can appropriately determine a mode ratio in double-mode collimated light emitted from the connector 202 of the transmitter 200, and thus guarantee communication quality of an optical communication system while eliminating out-of-specification products without use of an expensive part.

In addition, as described above, for the light intensity distribution obtained by the peak value distance shift unit 521*b* and shifted such that the distance of the peak value becomes the predetermined distance, the distance normalization unit 521*c* included in the signal processing unit of the determiner 520 performs a process for normalizing this light intensity distribution such that the distance corresponding to light intensity of the predetermined value, such as 1/e^2 of the peak value, becomes a predetermined distance, such as 4.4. However, a configuration eliminating the distance normalization unit 521*c* may be adopted. In this case, a normalization process similar to that process performed by the distance normalization unit 521*c* is not performed at the time of acquisition of the distance corresponding to the threshold of the ratio of the basic mode necessary for determination of the mode ratio by the mode ratio determination unit 521, or the graph indicating the correlation between the ratio of the basic mode and the distance.

FIG. 35 illustrates a configuration example of a determination system 50B which determines a light diameter of collimated light emitted from the connector 403 of the cable as a determination target. The determination system 50B here includes the transmitter 200, the cable 400, and a determiner 530.

The determiner 530 includes a connector 531, a signal processing unit 532, and a display unit 533. The connector 531 connected to the connector 403 of the cable 400 monitors light intensity distributions of collimated light emitted from the connector 403, and sends monitoring information to the signal processing unit 532. In this case, the connector 531 constitutes a light intensity distribution acquisition unit for acquiring light intensity distributions of collimated light.

While not explained in detail, the connector 531 has a configuration similar to the configuration of the connector 501 of the determination system 50A described above and illustrated in FIG. 30. Moreover, while not explained in detail, a connected state between the connector 403 of the cable 400 and the connector 531 of the determiner 530 is similar to the connected state between the connector 202 of the transmitter 200 and the connector 501 of the cable 510 described above and illustrated in FIG. 31.

While not explained in detail, the signal processing unit 532 has a configuration similar to the configuration of the signal processing unit 521 of the determiner 520 included in the determination system 50A described above and illustrated in FIG. 30 (see FIG. 33), and determines a mode ratio in collimated light emitted from the connector 403 of the cable 400, in reference to light intensity distribution information associated with collimated light transmitted from the connector 531, such as an imaging signal.

While not explained in detail, the display unit 533 has a configuration similar to the configuration of the display unit 522 of the determiner 520 included in the determination system 50A described above and illustrated in FIG. 30, and displays a determination result output from the signal processing unit 532, in reference to this determination result. While presented here is an example of a notification to the user by display of the determination result, also adoptable is a notification using voices, buzzer sounds, or the like together with the display or instead of the display.

As described above, the system 50B illustrated in FIG. 35 determines a mode ratio in reference to light intensity distribution information associated with collimated light that is emitted from the connector 403 of the cable 400 and that contains a basic mode component and a primary mode component, such as a slope of a curve at a portion corresponding to an increase in distances from a distance of a peak value of light intensity on the side where the peak value is present with respect to the center positioned at the optical axis of the collimated light in a light intensity distribution acquired in reference to an imaging signal. Accordingly, the determination system 50B can appropriately determine a mode ratio in double-mode collimated light emitted from the connector 403 of the cable 400, and thus guarantee communication quality of an optical communication system while eliminating out-of-specification products without use of an expensive part.

"Processing by Software"

The processes performed by the signal processing units 521 and 532 of the determiners 520 and 530 described above and illustrated in FIGS. 30 and 35 may be executed not only by hardware but also by software. For executing a series of the processes by software, a program constituting this software is installed from a recording medium into a computer incorporated in dedicated hardware, a computer capable of executing various functions under various programs installed therein, such as a general-purpose computer, or other types of computers.

Figure 36:
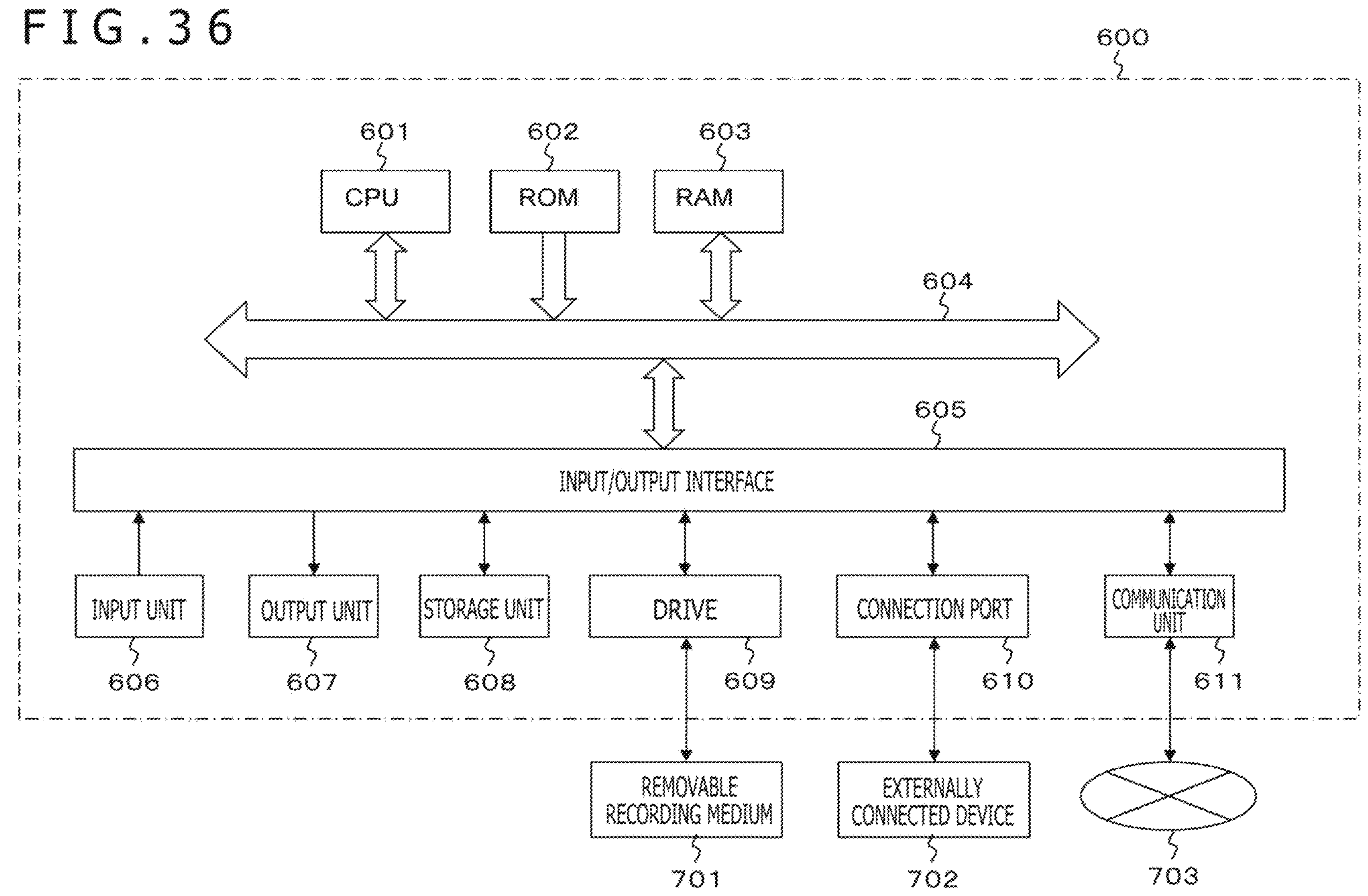
FIG. 36 is a block diagram illustrating a hardware configuration example of a computer.

FIG. 36 is a block diagram illustrating a hardware configuration example of a computer 600. The computer 600 includes a CPU 601, a ROM 602, a RAM 603, a bus 604, an input/output interface 605, an input unit 606, an output unit 607, a storage unit 608, a drive 609, a connection port 610, and a communication unit 611. Note that the hardware configuration described here is presented only by way of example. Some of constituent elements included therein may be eliminated. Moreover, constituent elements other than the constituent elements presented here may be further included.

For example, the CPU 601 functions as an arithmetic processing device or a control device, and controls the whole operation or a part of the operation of the respective constituent elements under various programs recorded in the ROM 602, the RAM 603, the storage unit 608, or the removable recording medium 701.

The ROM 602 is means for storing programs read by the CPU 601, data used for arithmetic operation, and the like. For example, programs read by the CPU 601, various parameters variable as necessary at the time of execution of these programs, and the like are temporarily or permanently stored in the RAM 603.

The CPU 601, the ROM 602, and the RAM 603 are connected to each other via the bus 604. Meanwhile, various constituent elements are connected to the bus 604 via the input/output interface 605.

For example, a mouse, a keyboard, a touch panel, a button, a switch, a lever, or the like is adoptable as the input unit 606. Moreover, a remote controller (hereinafter referred to as a remote control) capable of transmitting control signals by using infrared light or other radio waves is adopted as the input unit 606 in some cases.

For example, the output unit 607 is a device capable of notifying the user of acquired information in a visual or auditory manner. For example, a display device such as a CRT (Cathode Ray Tube), an LCD, and an organic EL, an audio output device such as a speaker and a headphone, a printer, a cellular phone, a facsimile machine, or the like is adoptable.

The storage unit 608 is a device for storing various kinds of data. For example, a magnetic storage device such as a hard disk drive (HDD), a semiconductor storage device, an optical storage device, a magneto-optical storage device, or the like is adoptable as the storage unit 608.

For example, the drive 609 is a device which reads information recorded in the removable recording medium 701 such as a magnetic disk, an optical disk, a magneto-optical disk, and a semiconductor memory, or writes information to the removable recording medium 701.

For example, the removable recording medium 701 is a DVD medium, a Blu-ray (registered trademark) medium, an HD-DVD medium, various types of semiconductor storage media, or the like. Needless to say, for example, the removable recording medium 701 may be an IC card equipped with a contactless IC chip, an electronic device, or the like.

For example, the connection port 610 is a port for connecting with an externally connected device 502, such as a USB (Universal Serial Bus) port, an HDMI (High-Definition Multimedia Interface) port, an IEEE1394 port, an SCSI (Small Computer System Interface), an RS-232C port, and an optical audio terminal. For example, the externally connected device 702 is a printer, a portable music player, a digital camera, a digital video camera, an IC recorder, or the like.

The communication unit 611 is a communication device for connecting with a network 703, such as a wired or wireless LAN, a communication card for Bluetooth (registered trademark) or WUSB (Wireless USB), a router for optical communication, a router for ADSL (Asymmetric Digital Subscriber Line), and a modem for various types of communication, for example.

Note that the program executed by the computer may be a program under which processes are performed in time series in the order described in the present description, or performed in parallel or at a necessary timing such as an occasion of a call.

2. Modifications

Note that the embodiment described above is an example where the first mode and the second mode correspond to the basic mode and the primary mode, respectively. However, the present technology is not limited to this example. The mode ratio can similarly be determined for collimated light including different two modes as the first mode and the second mode.

Moreover, while the first wavelength is 1310 nm in the embodiment described above, the first wavelength may be a wavelength in a range between 300 nm and 5 μm, for example, considering use of a laser light source or an LED light source as a light source.

Further, while the first wavelength is 1310 nm in the embodiment described above, the first wavelength here may be a wavelength in a band of 1310 nm including 1310 nm. In addition, while the first wavelength is 1310 nm in the embodiment described above, the first wavelength here may be 1550 nm, or a wavelength in a band of 1550 nm including 1550 nm. Moreover, while the second wavelength described here is 850 nm, the second wavelength may be a wavelength in a band of 850 nm including 850 nm. Further, described in the above embodiment is an example of the optical waveguide including the optical fiber. However, needless to say, the present technology is also applicable to an optical waveguide other than the optical fiber, such as a silicon optical waveguide, for example.

While the preferred embodiment of the present disclosure has been described above in detail with reference to the accompanying drawings, the technical scope of the present disclosure is not limited to this example. It is obvious that various examples of modifications and corrections can be arrived at by those having ordinary knowledges in the technical field of the present disclosure within the scope of the technical idea described in the claims. It should be understood that these modifications and corrections definitely belong to the technical scope of the present disclosure.

In addition, advantageous effects described in the present description are presented as only explanatory or exemplary effects, and not by way of limitation.

Accordingly, the technology according to the present disclosure can produce other advantageous effects obvious for those skilled in the art in light of the present description in addition to or in place of the above advantageous effects.

Note that the present technology can also take the following configurations.

(1)

A determination device including:

a light intensity distribution acquisition unit that acquires a light intensity distribution of collimated light containing a first mode component and a second mode component; and a determination processing unit that determines a mode ratio in reference to a slope of a curve that is included in the light intensity distribution on a side where a peak value of light intensity is present with respect to a center positioned at an optical axis of the collimated light and that is located at a portion corresponding to an increase in distances from a distance of the peak value.

(2)

The determination device according to (1) above, in which the first mode is a basic mode, and the second mode is a primary mode.

(3)

The determination device according to (1) or (2) above, in which the determination processing unit determines whether a ratio of the first mode contained in the collimated light is a threshold or higher.

(4)

The determination device according to (1) or (2) above, in which the determination processing unit determines a ratio of the first mode contained in the collimated light.

(5)

The determination device according to any one of (1) through (4) above, in which the determination processing unit normalizes the light intensity distribution such that the peak value of light intensity in the light intensity distribution becomes a predetermined value, and shifts the light intensity distribution such that a distance of the peak value of light intensity in the light intensity distribution becomes a predetermined value, to obtain a determination light intensity distribution, and the determination processing unit determines the mode ratio in reference to a distance at which light intensity in a curve that is included in the determination light intensity distribution and that corresponds to the curve becomes a predetermined value.

(6)

The determination device according to any one of (1) through (4) above, in which the determination processing unit normalizes the light intensity distribution such that the peak value of light intensity in the light intensity distribution becomes a predetermined value, and shifts the light intensity distribution such that a distance of the peak value of light intensity in the light intensity distribution becomes a predetermined value, to obtain a first determination light intensity distribution, the determination processing unit normalizes the first determination light intensity distribution such that a distance corresponding to light intensity of a predetermined value in the first determination light intensity distribution becomes a predetermined distance, to obtain a second determination light intensity distribution, and the determination processing unit determines the mode ratio in reference to a distance at which light intensity in a curve that is included in the second determination light intensity distribution and that corresponds to the curve becomes a predetermined value.

(7)

The determination device according to any one of (1) through (6) above, in which the light intensity distribution acquisition unit acquires the light intensity distribution in reference to an imaging signal obtained by capturing an image of the collimated light.

(8)

The determination device according to (7) above, further including:

an imaging element for obtaining the imaging signal.

(9)

The determination device according to (8) above, in which the imaging element is disposed on an optical connector.

(10)

The determination device according to any one of (1) through (9) above, in which the collimated light is obtained, with use of a collimating lens, by collimating light that has a second wavelength and that is output from an output end face of an optical waveguide that propagates only a first mode at a first wavelength, and the second wavelength is a wavelength at which the optical waveguide is configured to propagate at least the second mode along with the first mode.

(11)

The determination device according to (10) above, in which the collimating lens constitutes a receptacle of an electronic device, and the determination device further includes a reception unit that receives the collimated light collimated by the collimating lens.

(12)

The determination device according to (10) above, in which the collimating lens constitutes a plug of an optical cable, and the determination device further includes a reception unit that receives the collimated light collimated by the collimating lens.

(13)

The determination device according to any one of (1) through (12) above, further including:

a notification unit that issues a notification concerning the determination result.

(14)

A determination method including:

a process of acquiring a light intensity distribution of collimated light containing a first mode component and a second mode component; and a process of determining a mode ratio in reference to a slope of a curve that is included in the light intensity distribution on a side where a peak value of light intensity is present with respect to a center positioned at an optical axis of the collimated light and that is located at a portion corresponding to an increase in distances from a distance of the peak value.

(15)

A program for causing a computer to execute a determination method that includes:

a process of acquiring a light intensity distribution of collimated light containing a first mode component and a second mode component; and a process of determining a mode ratio in reference to a slope of a curve that is included in the light intensity distribution on a side where a peak value of light intensity is present with respect to a center positioned at an optical axis of the collimated light and that is located at a portion corresponding to an increase in distances from a distance of the peak value.

REFERENCE SIGNS LIST

10T, 10R: Optical fiber
10*a*: Core
10*b*: Clad
11T, 11R: Lens
50A, 50B: Determination system
100: Optical communication system
200: Transmitter
201: Light emission unit
202: Connector (receptacle)
203: Optical fiber
203*a*: Core
203*b*: Clad
211: Connector main body
212: Adhesive injection hole
213: Light emission portion (light transmission space)
214: Lens (collimating lens)
215: Position regulation portion
216: Optical fiber insertion hole
217: Adhesive
300: Receiver
301: Connector (receptacle)
302: Light reception unit
303: Optical fiber
400: Optical cable
401: Optical fiber
402, 403: Connector (plug)
411: Connector main body (ferrule)
400: Cable
401: Optical fiber
401*a*: Core
401*b*: Clad
402, 403: Connector (plug)
411: Connector main body
412: Adhesive injection hole
413: Light introduction portion (light transmission space)
414: Lens (collection lens)
415: Position regulation portion
416: Optical fiber insertion hole
417: Adhesive
501: Connector
510: Cable
511: Connector main body
512: Light intensity distribution monitoring element
513: Position movable jig
520: Determiner
521: Signal processing unit
521*a*: Light intensity normalization unit
521*b*: Peak value distance shift unit
521*c*: Distance normalization unit
521*d*: Mode ratio determination unit
522: Display unit
531: Connector
532: Signal processing unit
533: Display unit
600: Computer

The invention claimed is:

1. A determination device, comprising:

a connector configured to acquire a light intensity distribution of collimated light, wherein the collimated light contains a first mode component and a second mode component, and the connector includes:

an image sensor configured to output an imaging signal associated with the light intensity distribution of the collimated light; and a position movable jig configured to physically adjust a position of the image sensor for the acquisition of the light intensity distribution; and circuitry configured to determine a mode ratio in reference to a slope of a first curve, wherein the first curve is included in the light intensity distribution on a side where a peak value of light intensity is present with respect to a center positioned at an optical axis of the collimated light, and the first curve is located at a portion corresponding to an increase in distances from a specific distance of the peak value.

2. The determination device according to claim 1, wherein the first mode component is a basic mode, and the second mode component is a primary mode.

3. The determination device according to claim 1, wherein the circuitry is further configured to that a ratio of the first mode component contained in the collimated light is equal to or greater than a threshold.

4. The determination device according to claim 1, wherein the circuitry is further configured to determine a ratio of the first mode component contained in the collimated light.

5. The determination device according to claim 1, wherein the circuitry is further configured to:

normalize the light intensity distribution such that the peak value of the light intensity in the light intensity distribution becomes a first value;

shift the light intensity distribution such that a first distance of the peak value of the light intensity in the light intensity distribution becomes a second value, to obtain a determination light intensity distribution; and determine the mode ratio in reference to a second distance at which the light intensity in a second curve reaches a third value, wherein the second curve is included in the determination light intensity distribution.

6. The determination device according to claim 1, wherein the circuitry is further configured to:

normalize the light intensity distribution such that the peak value of the light intensity in the light intensity distribution becomes a first value;

shift the light intensity distribution such that a first distance of the peak value of the light intensity in the light intensity distribution becomes a second value, to obtain a first determination light intensity distribution;

normalize the first determination light intensity distribution such that a second distance corresponding to the light intensity of a third value in the first determination light intensity distribution becomes a third distance, to obtain a second determination light intensity distribution; and determine the mode ratio in reference to the third distance at which the light intensity in a second curve reaches the third value, wherein the second curve is included in the second determination light intensity distribution.

7. The determination device according to claim 1, wherein the connector is further configured to acquire the light intensity distribution in reference to the imaging signal obtained by capturing an image of the collimated light.

8. The determination device according to claim 1, further comprising:

a collimating lens configured to collimate light to obtain the collimated light, wherein the light has a first wavelength, the light is output from an output end face of an optical waveguide, and the optical waveguide is configured to:

propagate the first mode component at a second wavelength, and propagate at least the second mode component along with the first mode component at the first wavelength.

9. The determination device according to claim 8, wherein the collimating lens comprises a receptacle of an electronic device, and the determination device further includes a photodiode configured to receive the collimated light collimated by the collimating lens.

10. The determination device according to claim 8, wherein the collimating lens comprises a plug of an optical cable, and the determination device further includes a photodiode configured to receive the collimated light collimated by the collimating lens.

11. The determination device according to claim 1, wherein the circuitry is further configured to control issuance of:

a notification regarding a determination result corresponding to the determined mode ratio.

12. A determination method, comprising:

acquiring, by a connector, a light intensity distribution of collimated light containing a first mode component and a second mode component;

outputting, by an image sensor, an imaging signal associated with the light intensity distribution of the collimated light;

physically adjusting, by a position movable jig, a position of the image sensor for the acquisition of the light intensity distribution, wherein the position movable jig and the image sensor are included in the connector; and determining a mode ratio in reference to a slope of a curve, wherein the curve is included in the light intensity distribution on a side where a peak value of light intensity is present with respect to a center positioned at an optical axis of the collimated light, and the curve is located at a portion corresponding to an increase in distances from a distance of the peak value.

13. A non-transitory computer-readable medium having stored thereon, computer-executable instructions which, when executed by a computer, cause the computer to execute operations, the operations comprising:

acquiring, by a connector, a light intensity distribution of collimated light containing a first mode component and a second mode component;

outputting, by an image sensor, an imaging signal associated with the light intensity distribution of the collimated light;

physically adjusting, by a position movable jig, a position of the image sensor for the acquisition of the light intensity distribution, wherein the position movable jig and the image sensor are included in the connector; and determining a mode ratio in reference to a slope of a curve, wherein the curve is included in the light intensity distribution on a side where a peak value of light intensity is present with respect to a center positioned at an optical axis of the collimated light, and the curve is located at a portion corresponding to an increase in distances from a distance of the peak value.

* * * * *